United States Patent
Ben-Ami

(10) Patent No.: US 6,301,267 B1
(45) Date of Patent: Oct. 9, 2001

(54) SMART SWITCH

(75) Inventor: Raphael Ben-Ami, Tel Aviv (IL)

(73) Assignee: Urizen Ltd., Tel Aviv (IL)

( * ) Notice: Subject to any disclaimer, the term of this patent is extended or adjusted under 35 U.S.C. 154(b) by 0 days.

(21) Appl. No.: 08/889,199

(22) Filed: Jul. 8, 1997

(30) Foreign Application Priority Data

Mar. 13, 1997 (IL) ........................................ 120449

(51) Int. Cl.$^7$ .................................. H04J 3/16; H04J 3/17
(52) U.S. Cl. ............................................ 370/468; 370/400
(58) Field of Search ..................... 370/230–238, 370/465, 468, 257, 258, 252, 400, 477; 709/220, 221, 222, 223, 226, 253

(56) References Cited

U.S. PATENT DOCUMENTS

| | | | |
|---|---|---|---|
| 5,233,604 | * | 8/1993 | Ahamdi et al. ................... 370/468 |
| 5,434,848 | * | 7/1995 | Chimento et al. ................. 370/468 |
| 5,978,380 | * | 11/1999 | Kobayashi et al. ............... 370/468 |

FOREIGN PATENT DOCUMENTS

WO 95/34973   12/1995  (WO) .

OTHER PUBLICATIONS

Kwang–Ting Cheng, et al., "On the Joint Virtual Path Assignment and Virtual Circuit Routing Problem in ATM Networks", Proceedings of the Global Telecommunications Conference, San Francisco, Nov. 28–Dec. 2, 1994, pp. 777–782.

Yener B. et al., "Atopological Design of Loss–Free Switch–Based LANs ", Proceedings of Infocom '95—Conference on Computer Communications, Boston, Apr. 2–6, 1995, pp. 88–96.

Wideband and Broadband Digital Cross–Connect Systems Generic Criteria—A Module of TSGR, FR–NWT–000440, Technical Reference TR–NWT–00233, Bellcore: Bell Communications Research, Issue 3, Nov. 1993.

ATM Functionality in Sonet Digital Cross–Connect Systems Generic Criteria—A Module of TSGR,FR–440, Generic Requirements GR–2891–Core, Bellcore: Bell Communications Research, Issue 1, Aug. 1995.

Types and General Characteristics of Synchronous Digital Hierarchy (SDH) Equipment, ITU–T Recommendation G.782, International Telecommunication Union, Jan. 1994.

The ATM Report—Asynchronous Transfer Mode: Products, Services, Markets and Applications, Broadband Publishing Corporation, 1996.

(List continued on next page.)

*Primary Examiner*—Ricky Ngo
(74) *Attorney, Agent, or Firm*—Abelman, Frayne & Schwab

(57) ABSTRACT

A method for increasing the total capacity of a network, the network including a first plurality of communication edges interconnecting a second plurality or communication nodes, the first plurality of communication edges and the second plurality of communication nodes having corresponding first and second pluralities of capacity values respectively, the first and second pluralities of capacity values determining the total capacity of the network. The method includes expanding the capacity value of at last an individual communication edge from among the first plurality of communication edges, the individual edge connecting first and second communication nodes from among the second plurality of communication nodes, without expanding the capacity value of the first communication node, wherein the expanding step includes reducing the capacity value of at least one additional communication edge connecting the first communication node and a third node, different from the second node.

5 Claims, 23 Drawing Sheets

OTHER PUBLICATIONS

The Stinger Family of ATM Switches, Products and Technology, http://www.scorpio.com/ProductsTech.html; http://www.scorpio.com/stinger5.html; http://www.scorpio.com/press.html, 1997.

Traffice Control and Congestion Control in B–ISDN, ITU Telecommunication Standardization Sector, Study Group 13, ITU–T Recommendation 1.371, Nov. 1995, pp. 1–81.

Digital Cross–Connect Systems: Strategies, Markets & Opportunities Through 2000, The Pelorus Group, Nov. 1996, pp. 1–282.

Brochure: 3645 Mainstreet: High Capacity Bandwidth Manager, Newbridge Networks, Inc.

Brochure: 36170 Mainstreet: High–Capacity ATM Switching, Newbridge Networks, Inc.

Brochure: 36150 Mainstreet—Comprehensive Broadband ATM Networking, Newbridge Networks, Inc.

Brochure: 3600 Mainstreet—Multiplexer, Channel Bank, and Digital Cross–Connect Switch, Newbridge Networks, Inc.

Brochure: Alcatel 1100 HSS, Series 700, Multiservice Network Switch, Alcatel Data Networks.

Brochure: Alcatel 1100 LSS, High Performance LAN Switching, Alcatel Data Networks.

Alcatel 1100 LSS LAN Switching System, Product Boilerplate, Version 1.2.1, Alcatel Data Networks, Jul. 1996.

Brochure: Alcatel 1100 HSS—Detailed Product Description, Alcatel Data Networks, Jul. 1996, pp. 35–38.

Brochure: Alcatel 1644 SX—140/155 Mbit/s ports, Network Cross–Connect, Alcatel Data Networks.

Brochure: Alcatel 1641 SX, Synchronous 4–3–1 Cross–Connect–System, Alcatel Data Networks.

Brochure: Siemens EWSX Press 36190: ATM Core Switch, Issued by the Public Communication Network Group Broadband Networks, Germany.

Brochure: Siemens Switching Facility CC155 for Network Node NK2000.

Brochure: RN64 Time Division Digital Cross–Connect Equipment, Alcatel Data Network Systems.

Network Solutions Tellabs: Titan Digital Cross–Connect Systems, http://www.tellabs.com/solutions/titan.html#vpnm, pp.1–6.

* cited by examiner

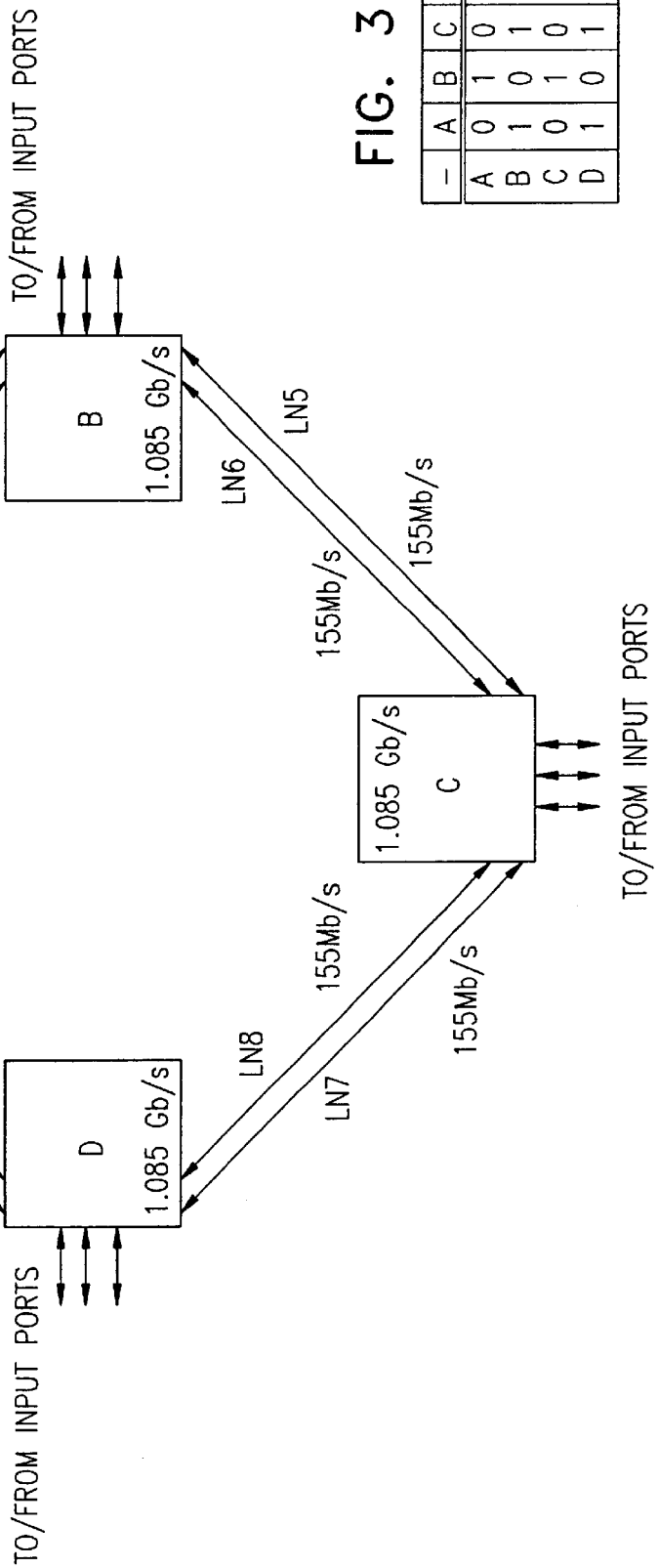
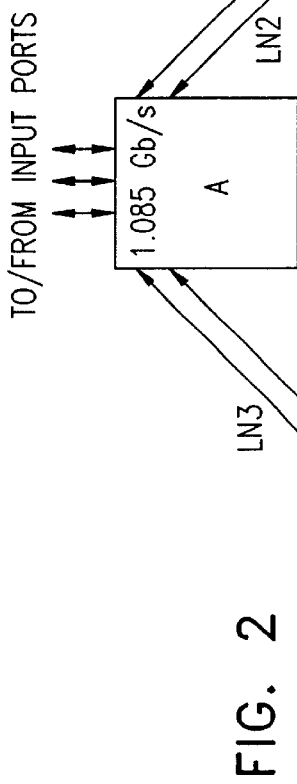
FIG. 2
FIG. 3

FIG. 4

| - | A (Mb/s) | B (Mb/s) | C (Mb/s) | D (Mb/s) |
|---|---|---|---|---|
| A | 0 | 155 | 155 | 155 |
| B | 155 | 0 | 155 | 155 |
| C | 155 | 155 | 0 | 155 |
| D | 155 | 155 | 155 | 0 |

FIG. 5

| | 1 | 2 | 3 | 4 | 5 | 6 | 7 |
|---|---|---|---|---|---|---|---|
| | Adjacent nodes | Link ID | Link capacity (Mb/s) | Link allocation (Mb/s) | Link Utilization (Mb/s) | Link state | Link priority |
| 210 | A, B | LN1 | 155 | 155 | 155 | A | 1 |
| 220 | | LN2 | 155 | 155 | 155 | A | 2 |
| 230 | A, D | LN3 | 155 | 155 | 155 | A | 1 |
| 240 | | LN4 | 155 | 155 | 155 | A | 2 |
| 250 | B, C | LN5 | 155 | 155 | 155 | A | 1 |
| 260 | | LN6 | 155 | 155 | 155 | A | 2 |
| 270 | C, D | LN7 | 155 | 155 | 155 | A | 1 |
| 280 | | LN8 | 155 | 155 | 155 | A | 2 |

FIG. 6

| Node ID | Nonblocking capacity (Gb/s) | Utilization (Gb/s) | Unused ≥ 0 Capacity (Gb/s) |
|---|---|---|---|
| A | 1.085 | 1.085 | 0 |
| B | 1.085 | 1.085 | 0 |
| C | 1.085 | 1.085 | 0 |
| D | 1.085 | 1.085 | 0 |

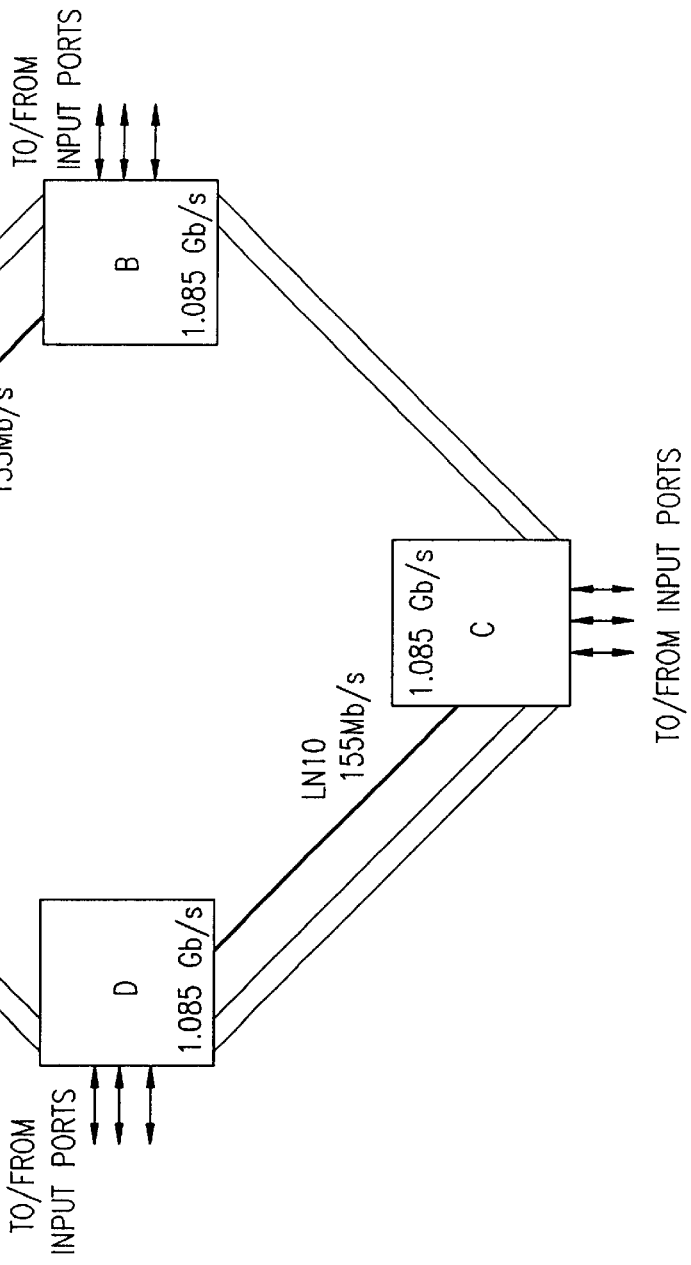

FIG. 10

|  | 1 | 2 | 3 | 4 | 5 | 6 | 7 |
|---|---|---|---|---|---|---|---|
|  | Adjacent nodes | Link ID | Link capacity (Mb/s) | Link allocation (Mb/s) | Link Utilization (Mb/s) | Link state | Link priority |
| 210 | A, B | LN1 | 155 | 155 | 0 | A | 1 |
| 220 |  | LN2 | 155 | 155 | 0 | A | 2 |
|  |  | LNX9 | 155 | 0 | 0 | I | 3 |
| 230 | A, D | LN3 | 155 | 155 | 0 | A | 1 |
| 240 |  | LN4 | 155 | 155 | 0 | A | 2 |
| 250 | B, C | LN5 | 155 | 155 | 0 | A | 1 |
| 260 |  | LN6 | 155 | 155 | 0 | A | 2 |
| 270 | C, D | LN7 | 155 | 155 | 0 | A | 1 |
| 280 |  | LN8 | 155 | 155 | 0 | A | 2 |
|  |  | LNX10 | 155 | 0 | 0 | I | 3 |

FIG. 11

|  | 1 | 2 | 3 | 4 | 5 | 6 | 7 |
|---|---|---|---|---|---|---|---|
|  | Adjacent nodes | Link ID | Link capacity (Mb/s) | Link allocation (Mb/s) | Link Utilization (Mb/s) | Link state | Link priority |
| 210 | A, B | LN1 | 155 | 155 | 155 | A | 1 |
| 220 |  | LN2 | 155 | 155 | 155 | A | 2 |
|  |  | LNX9 | 155 | 155 | 155 | A | 3 |
| 230 | A, D | LN3 | 155 | 155 | 0 | A | 1 |
| 240 |  | LN4 | 155 | 0 | 0 | I | 2 |
| 250 | B, C | LN5 | 155 | 155 | 0 | A | 1 |
| 260 |  | LN6 | 155 | 0 | 0 | I | 2 |
| 270 | C, D | LN7 | 155 | 155 | 155 | A | 1 |
| 280 |  | LN8 | 155 | 155 | 155 | A | 2 |
|  |  | LNX10 | 155 | 155 | 155 | A | 3 |

FIG. 12

| NODE ID | NONBLOCKING CAPACITY (Gb/s) | utilization (Gb/s) | unused CAPACITY (Gb/s) |
|---|---|---|---|
| A | 1.085 | 0.93 | 0.15 |
| B | 1.085 | 0.93 | 0.15 |
| C | 1.085 | 0.93 | 0.15 |
| D | 1.085 | 0.93 | 0.15 |

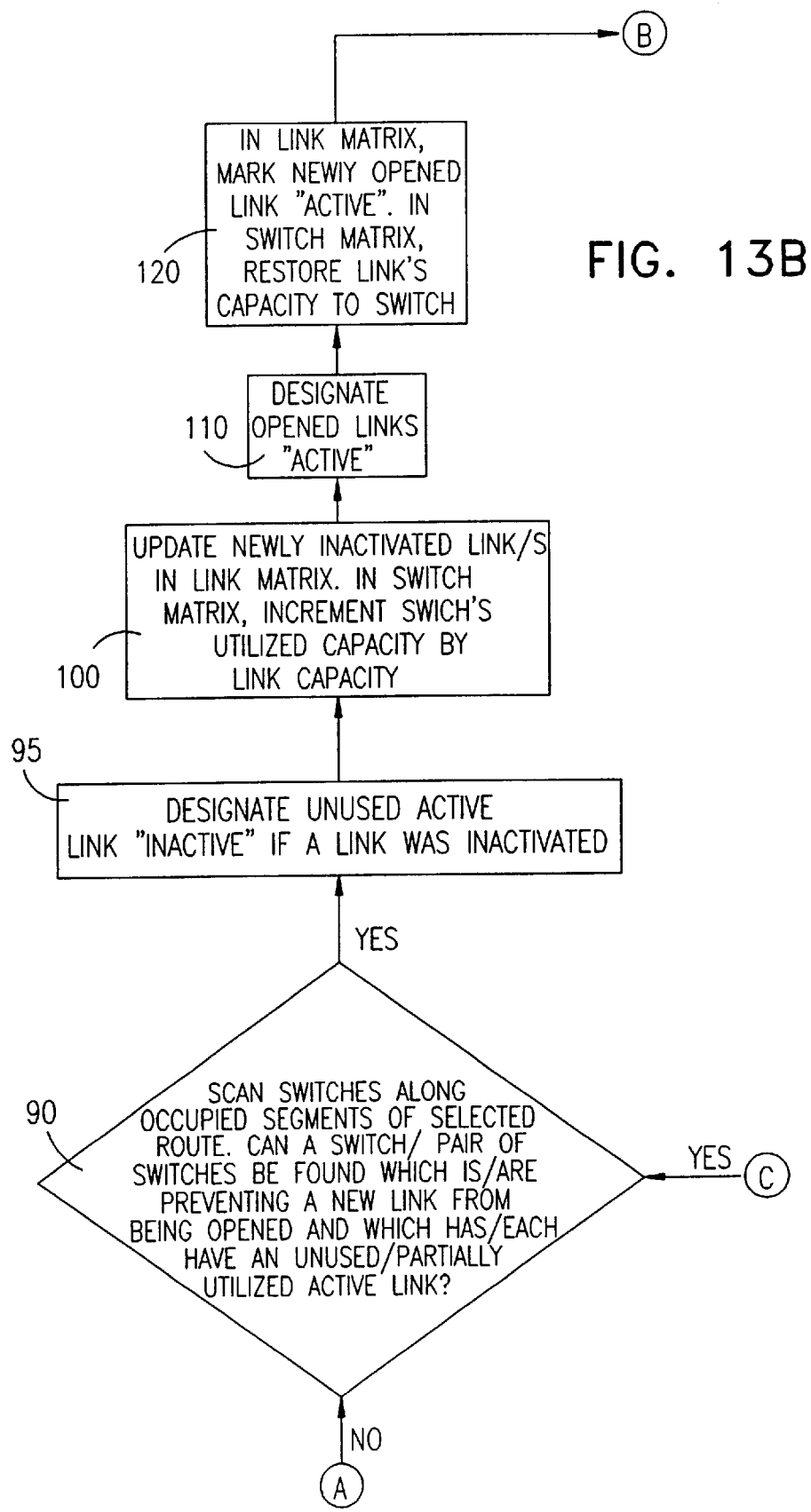

FIG. 15

| - | A | B | C | D |
|---|---|---|---|---|
| A | 0 | 1 | 0 | 0 |
| B | 1 | 0 | 1 | 1 |
| C | 0 | 1 | 0 | 0 |
| D | 0 | 1 | 0 | 0 |

FIG. 16

| - | A (Mb/s) | B (Mb/s) | C (Mb/s) | D (Mb/s) |
|---|---|---|---|---|
| A | 0 | 100 | 100 | 100 |
| B | 100 | 0 | 100 | 100 |
| C | 100 | 100 | 0 | 100 |
| D | 100 | 100 | 100 | 0 |

|   | 1 | 2 | 3 | 4 | 5 | 6 | 7 |
|---|---|---|---|---|---|---|---|
|   | Adjacent nodes | Link ID | Link capacity (Mb/s) | Link allocation (Mb/s) | Link Utilization (Mb/s) | Link state | Link priority |
| 300 | A, B | LN1 | 155 | VPI=1(155) | 100 | A | 1 |
| 310 |      | LN2 | 155 | VPI=2(155) | 100 | A | 2 |
| 320 |      | LN3 | 155 | VPI=3(155) | 100 | A | 3 |
| 330 | D, B | LN4 | 155 | VPI=1(155) | 100 | A | 1 |
| 340 |      | LN5 | 155 | VPI=2(155) | 100 | A | 2 |
| 350 |      | LN6 | 155 | VPI=3(155) | 100 | A | 3 |
| 360 | C, B | LN7 | 155 | VPI=1(155) | 100 | A | 1 |
| 360 |      | LN8 | 155 | VPI=2(155) | 100 | A | 2 |
| 370 |      | LN9 | 155 | VPI=3(155) | 100 | A | 3 |

FIG. 17

| Node ID | Nonblocking Capacity (Gb/s) | Utilized Capacity (Gb/s) | Unused capacity (Gb/s) |
|---|---|---|---|
| A | 0.93 | 0.93 | 0 |
| B | 1.86 | 1.86 | 0 |
| C | 0.93 | 0.93 | 0 |
| D | 0.93 | 0.93 | 0 |

FIG. 18

| - | A(Mb/s) | B(Mb/s) | C(Mb/s) | D(Mb/s) |
|---|---|---|---|---|
| A | 0 | 100 | 0 | 0 |
| B | 100 | 0 | 100 | 100 |
| C | 0 | 100 | 0 | 0 |
| D | 0 | 100 | 0 | 0 |

|  | 1 | 2 | 3 | 4 | 5 | 6 | 7 |
|---|---|---|---|---|---|---|---|
|  | Adjacent nodes | Link ID | Link capacity (Mb/s) | Link allocation (Mb/s) | Link Utilization (Mb/s) | Link state | Link priority |
| 300 | A, B | LN1 | 155 | VPI=1(155) | 100 | A | 1 |
| 310 |  | LN2 | 155 | VPI=2(155) | 100 | A | 2 |
| 320 |  | LN3 | 155 | VPI=3(155) | 100 | A | 3 |
|  |  | LNX10 | 155 | VPI=4(0) | 0 | I | 4 |
| 330 | C, B | LN4 | 155 | VPI=1(155) | 100 | A | 1 |
| 340 |  | LN5 | 155 | VPI=2(155) | 100 | A | 2 |
| 350 |  | LN6 | 155 | VPI=3(155) | 100 | A | 3 |
|  |  | LNX11 | 155 | VPI=4(0) | 0 | I | 4 |
| 360 | D, B | LN7 | 155 | VPI=1(155) | 100 | A | 1 |
| 370 |  | LN8 | 155 | VPI=2(155) | 100 | A | 2 |
| 380 |  | LN9 | 155 | VPI=3(155) | 100 | A | 3 |
|  |  | LNX12 | 155 | VPI=4(0) | 0 | I | 4 |

|  | 1 | 2 | 3 | 4 | 5 | 6 | 7 |
|---|---|---|---|---|---|---|---|
|  | Adjacent nodes | Link ID | Link capacity (Mb/s) | Link allocation (Mb/s) | Link Utilization (Mb/s) | Link state | Link priority |
| 300 | A, B | LN1 | 155 | VPI=1(155) | 100 | A | 1 |
| 310 |  | LN2 | 155 | VPI=2(100) | 100 | A | 2 |
| 320 |  | LN3 | 155 | VPI=3(100) | 100 | A | 3 |
|  |  | LNX10 | 155 | VPI=4(100) | 100 | A | 4 |
| 330 | C, B | LN4 | 155 | VPI=1(155) | 100 | A | 1 |
| 340 |  | LN5 | 155 | VPI=2(100) | 100 | A | 2 |
| 350 |  | LN6 | 155 | VPI=3(100) | 100 | A | 3 |
|  |  | LNX11 | 155 | VPI=4(100) | 100 | A | 4 |
| 360 | D, B | LN7 | 155 | VPI=1(155) | 100 | A | 1 |
| 370 |  | LN8 | 155 | VPI=2(100) | 100 | A | 2 |
| 380 |  | LN9 | 155 | VPI=3(100) | 100 | A | 3 |
|  |  | LNX12 | 155 | VPI=4(100) | 100 | A | 4 |

FIG. 22

| Node ID | Nonblocking Capacity (Gb/s) | Utilized Capacity (Gb/s) | Unused capacity (Gb/s) |
|---|---|---|---|
| A | 0.93 | 0.92 | 0.03 |
| B | 1.86 | 1.83 | 0.03 |
| C | 0.93 | 0.92 | 0.03 |
| D | 0.93 | 0.92 | 0.03 |

FIG. 23

FIG. 29
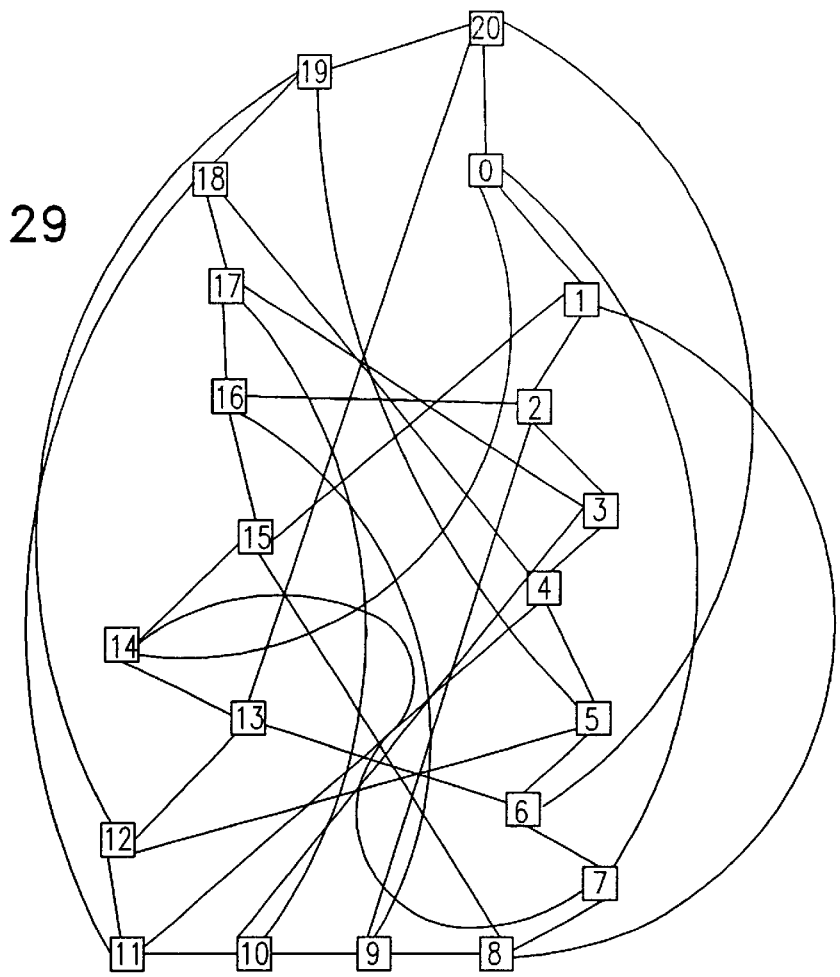
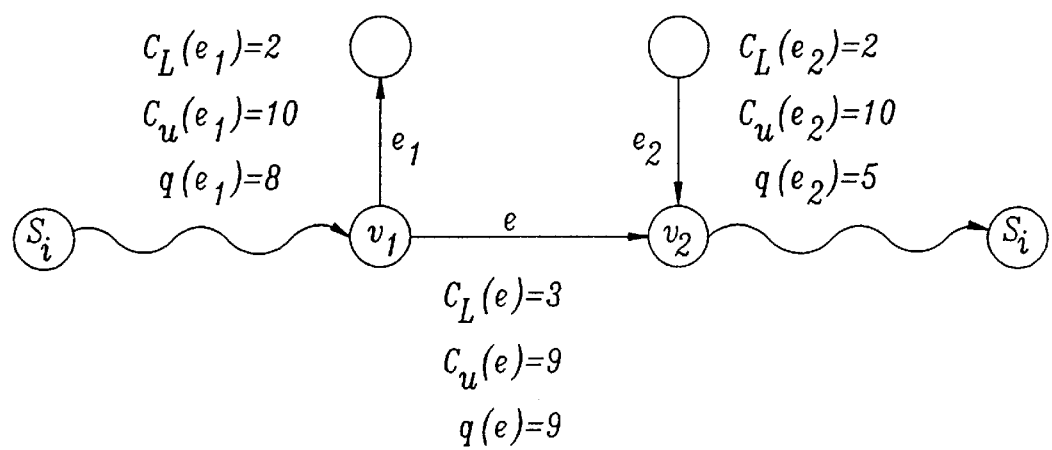
FIG. 30

SMART SWITCH

FIELD OF THE INVENTION

The present invention relates to apparatus and methods for utilizing communication networks.

BACKGROUND OF THE INVENTION

Currently marketed switches and cross-connects are non-blocking. Examples include Alcatel's 1100 (HSS and LSS), 1641 and 1644 switches, AT&T's II and DACS III switches (Lucent technology), TITAN's 5300 and RN64 series, Siemens EWSXpress 35190 ATM Core Switch and Switching Faulty CC155 systems, Newbridge's 3600, 3645, 36150 and 36170 MainStreet switches and the Stinger family of ATM switches.

A review of ATM (asynchronous transfer mode) switching products, namely "The ATM Report", Broadband Publishing Corporation, ISSN 10720981X, 1996 surveys 10 switches of which nine are completely non-blocking and one, CISCO, has a positive but very low blocking probability (3% probability of blocking at 2 Gbps).

The ITU-T Recommendation G.782 (International Telecommunication Union, Telecommunication Standardization Sector, 01/94) includes Section 4.5 entitled "Blocking" which states:

"The existence of cross-connections in a cross-connect equipment can prevent the set-up of a new cross-connection. The blocking factor of a cross-connect is the probability that a particular connection request cannot be met, normally expressed as a decimal fraction of 1. Fully non-blocking (i.e. blocking factor=0) cross-connects can be built. Some simplification in design, and hence cost, can be realized if a finite blocking factor is acceptable. It is not the invention of this Recommendation to specify target blocking factors for individual cross-connect equipment. The impact of non-zero blocking factor on network performance is dependent on network design and planning rules.

"There is a class of cross-connect matrices known as conditionally non-blocking in which there is a finite probability that a connection request may be blocked. In such cross-connects, it is possible, by re-arranging existing connections, to make a cross-connection which would otherwise be blocked. As an objective, in such cases, rearrangements should be made without interruption to rearranged paths.

"It may be necessary in a nominally non-blocking, or conditionally non-blocking cross-connect, to accept some blocking penalty associated with extensive use of broadcast connections. This is for further study."

A later document "ATM functionality in SONET digital cross-connect systems—generic criteria", Generic Requirements CR-2891-CORE, Issue Aug. 1, 1995, Bellcore (Bell Communications Research) states as a requirement that "A SONET DCS with ATM functionality must meet all existing DCS requirements from TR-NWT-000233". The TR-NWT-000233 publication (Bellcore, Issue Nov. 3, 1993, entitled "Wideband and broadband digital cross-connect systems generic criteria") stipulates the following requirement (R) 4-37:

"For a two-point unidirectional cross-connection, non-blocking cross-connection shall be provided. Non-blocking means that a cross-connection can be made regardless of other existing connections. Rearranging the existing cross-connections to accommodate a new cross-connection is acceptable only if the rearrangement is performed without causing any bit error for the rearranged cross-connections."

The disclosures of all publications mentioned in the specification and of the publications cited therein are hereby incorporated by reference.

SUMMARY OF THE INVENTION

The present invention seeks to provide methods and apparatus for expanding the capacity of a network.

There is thus provided in accordance with a preferred embodiment of the present invention a method for increasing the total capacity of a network, the network including a first plurality of communication edges (communication links) interconnecting a second plurality of communication nodes (transceivers), the first plurality of communication edges and the second plurality of communication nodes having corresponding first and second pluralities of capacity values respectively. The first and second pluralities of capacity values form corresponding topologies which determine the total capacity of the network. The method includes expanding the capacity value of at least an individual communication edge from among the first plurality of communication edges, the individual edge connecting first and second communication nodes from among the second plurality of communication nodes, without expanding the capacity value of the first communication node.

In conventional methods, to expand total capacity, the capacities of at least a subset of nodes is expanded, plus the capacities of all edges and only those edges which connect a pair of nodes within that subset.

There is thus provided, in accordance with a preferred embodiment of the present invention, a method for increasing the total capacity of a network, the network including a first plurality of communication edges interconnecting a second plurality of communication nodes, the first plurality of communication edges and the second plurality of communication nodes having corresponding first and second pluralities of capacity values respectively, the first and second pluralities of capacity values determining the total capacity of the network, the method including expanding the capacity value of at least an individual communication edge from among the first plurality of communication edges, the individual edge connecting first and second communication nodes from among the second plurality of communication nodes, without expanding the capacity value of the first communication node.

Further in accordance with a preferred embodiment of the present invention, the method includes performing the expanding step until the total capacity of the network reaches a desired level, and expanding the capacity values of at least one of the second plurality of communication edges such that all of the second plurality of communication edges have the same capacity.

Also provided, in accordance with another preferred embodiment of the present invention, is a method for expanding the total capacity of a network, the network including a first plurality of communication edges interconnecting a second plurality of communication nodes, the first plurality of communication edges and the second plurality of communication nodes having corresponding first and second pluralities of capacity values respectively, the first and second pluralities of capacity values determining the total capacity of the network, the method including determining, for each individual node from among the second plurality of communication nodes, the amount of traffic entering the network at the individual node, and, for each edge connected to the individual node, if the capacity of the edge is less than the amount of traffic, expanding the capacity of the edge to the amount of traffic.

Also provided, in accordance with another preferred embodiment of the present invention, is a method for constructing a network, the method including installing a first plurality of communication edges interconnecting a second plurality of communication nodes, and determining first and second pluralities of capacity values for the first plurality of communication edges and the second plurality of communication nodes respectively such that, for at least one individual node, the sum of capacity values of the edges connected to that node exceeds the capacity value of that node.

Further provided, in accordance with another preferred embodiment of the present invention, is a network including a first plurality of communication edges having a first plurality of capacity values respectively, and a second plurality of communication nodes having a second plurality of capacity values respectively, wherein the first plurality of communication edges interconnects the second plurality of communication nodes such that, for at least one individual node, the sum of capacity values of the edges connected to that node exceeds the capacity value of that node.

Also provided, in accordance with yet another preferred embodiment of the present invention, is a method for allocating traffic to a network, the method including providing a network including at least one blocking switches, receiving a traffic requirement, and allocating traffic to the network such that the traffic requirement is satisfied and such that each of the at least one blocking switches is non-blocking at the service level.

Further in accordance with a preferred embodiment of the present invention, the step of allocating traffic includes selecting a candidate route for an individual traffic demand, and, if the candidate route includes an occupied segment which includes at least one currently inactive link, searching for a switch which would be blocking at the service level if the inactive link were activated and which has an unused active link which, if activated, would cause the switch not be blocking at the service level if the currently inactive link were activated, and if the searching step finds such a switch, activating the currently inactive link and inactivating the unused active link.

The network may include a circuit switched network or TDM network or an ATM network.

Also provided, in accordance with another preferred embodiment of the present invention, is apparatus for allocating traffic to a network, the apparatus including a traffic requirement input device operative to receive a traffic requirement for a network including at least one blocking switches, and a traffic allocator operative to allocate traffic to the network such that the traffic requirement is satisfied and such that each of the at least one blocking switches is non-blocking at the service level.

BRIEF DESCRIPTION OF THE DRAWINGS

The present invention will be understood and appreciated from the following detailed description, taken in conjunction with the drawings in which:

FIG. 2 is an illustration of a four node non-blocking ring network;

FIG. 3 is an illustration of the adjacency matrix of the network of FIG. 2;

FIG. 4 is an illustration of a network traffic requirement matrix for the network of FIG. 2, which matrix satisfies non-blocking criteria;

FIG. 5 is an illustration of an initial link state matrix showing initial network link states for the network of FIG. 2 for the traffic requirement matrix of FIG. 4;

FIG. 6 is an illustration of an initial switch matrix for the traffic requirement matrix of FIG. 4;

FIG. 8 is an illustration of another network traffic requirement matrix for the network of FIG. 2;

FIG. 9 is an illustration of a blocking configuration of the ring network of FIG. 2;

FIG. 10 is an illustration of a link state matrix for the blocking ring network of FIG. 9;

FIG. 11 is an illustration of the link state matrix for the ring network of FIG. 9 once the traffic requirement of FIG. 8 has been allocated thereto according to the method of FIG. 1;

FIG. 12 is an illustration of the switch state matrix for the ring network of FIG. 9 once the traffic requirement of FIG. 8 has been allocated thereto according to the method of FIG. 1;

FIG. 15 is an illustration of an adjacency matrix for the network of FIG. 14;

FIG. 16 is a traffic requirement matrix for the network of FIG. 14;

FIG. 17 is an illustration of an initial link state matrix for the network of FIG. 14;

FIG. 18 is an illustration of an initial switch state matrix for the network of FIG. 14 which satisfies the requirement matrix of FIG. 16;

FIG. 19 is an illustration of another traffic requirement matrix for the network of FIG. 14 which is impossible to fulfill;

FIG. 21 is an illustration of an initial link state matrix for the network of FIG. 20;

FIG. 22 is an illustration of the network link state matrix for the network of FIG. 20, following operation of the method of FIG. 17 on the net work of FIG. 20;

FIG. 23 is an illustration of the switch state matrix for the network of FIG. 20 following operation of the method of FIG. 17 on the network of FIG. 20;

FIG. 29 is an illustration of a 21 node network example;

FIG. 30 is an illustration of expanding a congested link e along the route;

DETAILED DESCRIPTION OF PREFERRED EMBODIMENTS

Figure 1:
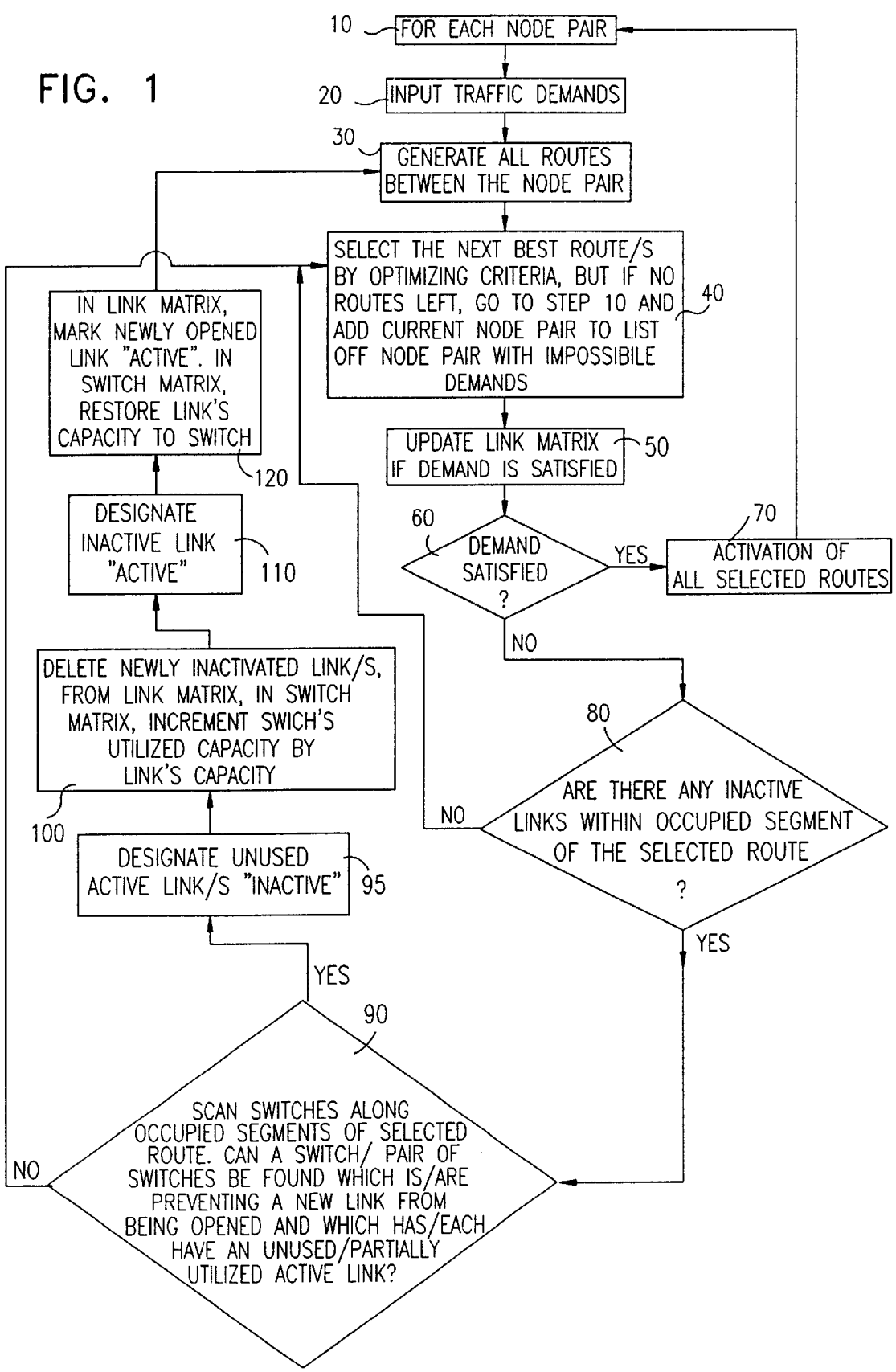
FIG. 1 is a simplified flowchart illustration of a method for allocating traffic to a circuit switch blocking network.

Reference is now made to FIG. 1 which is a simplified flowchart illustration of a method for allocating traffic to a circuit switch blocking network. The method of FIG. 1 preferably comprises the following steps for each individual node pair in the blocking network. The method of FIG. 1 is performed repeatedly for all node pairs in the blocking network, using the same link matrix for all node pairs. The terms "link" and "edge" are used essentially interchangeably in the present specification and claims.

Step 10 defines a loop.

In step 20, the traffic demands are defined by a user. Typically, the traffic demand includes a quantity of traffic which is to pass between the two nodes in the node pair.

In step 30, all routes are generated between the nodes in the node pair, e.g. by using the adjacency matrix of the network. Typically, in practice, all routes are generated which satisfy certain reasonableness criteria, e.g. which include less than a threshold number of hops.

In step 40, the next best route is selected, based on suitable optimizing criteria such as cost. If more than one routes are equal in terms of the optimizing criteria, and if more than one demands are defined for the node pair (e.g. two demands of 155 Mb/s each for the same node pair) then typically each of these routes are selected simultaneously.

In step 50, the link size of the next best route/s is reduced to indicate that that/those route/s is/are more occupied or even totally occupied due to the portion of the traffic that has been allocated to that/those route/s.

Step 60 asks whether the demand defined in step 20 has been satisfied. If so, the selected route or routes is/are activated (step 70) and the method returns to step 10 in which the same route-finding process is performed for the next node pair, continuing to use the same link matrix.

If the demand is not satisfied, then, according to a preferred embodiment of the present invention, an attempt is made (step 80) to activate inactive links, if any, in order to allow the demand to be met without resorting to selection of less desirable routes in terms of the optimizing criteria. If no such inactive links exist, the method resorts to selection of less desirable routes in terms of the optimizing criteria by returning to step 40.

If such inactive links exist, in occupied segments of the selected route/s, then it is assumed that activation of each of these inactive links would cause at least one switch along the selected route/s to block on the service level. A switch is considered to "block on the service level" if the traffic allocated to the routes entering the switch exceeds the traffic allocated to routes exiting the switch. It is appreciated that a blocking switch may nonetheless be found to be non-blocking on the service level.

Preferably, if a plurality of links exist between a pair of switches, the links are assigned priorities by the user such that the lowest priority link is activated first and inactivated last and the highest priority link is activated last and inactivated first. If no priorities are defined, any inactive link may be selected for activation.

In step 90, the method scans the switches along occupied segments of the selected route and tries to find a switch (or pair of switches) which is (are) preventing an inactive link from being activated and which has (or which each have) an unused active link. Some inactive links are prevented from being activated by only one of the switches they are connected to. In this case, only that switch needs to have an unused active link. Some inactive links are prevented from being activated by both of the switches they are connected to. In this case, each of the two switches needs to have an unused active link.

If the test of step 90 is not passed, then the method returns to step 40, i.e. the method resorts to less desirable routes.

If the test of step 90 if passed, i.e. if an inactive link exists along the occupied segments of the selected route which can be activated at the price of inactivating one or two adjacent active unused links, then the active unused link/s is/are inactivated (steps 95 and 100) and the inactive link is activated (steps 110 and 120) and the method then, according to one embodiment of the present invention, returns to step 30. Alternatively, in certain applications, the method may return to step 40 or step 50.

A four node non-blocking ring network is illustrated in FIG. 2. The adjacency matrix of the network of FIG. 2 is illustrated in FIG. 3. The links connecting adjacent nodes in FIG. 2 each have a capacity of 155 Mb/s. The application is assumed to be a circuit switch application, i.e. the amount of traffic allocated to each used link may be exactly its capacity either as a single unit or as a product of smaller units whose total sums up to the link capacity.

The network of FIG. 2 is to be used to satisfy the network traffic requirement illustrated in FIG. 4. All of the switches in FIG. 2 are non-blocking because their capacities are 155 Mb/s×8=1.24 Gb/s, i.e. 8 times the link capacity (four incoming links and four outgoing links per switch, as shown).

The initial link state matrix is shown in FIG. 5, where the first column indicates the two switches connected by each link, the second column the link's ID, the third column indicates the link's capacity, the fourth column indicates the current traffic allocation to each link, the fifth column indicates the extent to which the link is currently utilized, the sixth column indicates the state of each link (active or inactive), and the seventh column indicates each link's priority for activation.

It is appreciated that the network of FIG. 2 is non-blocking and remains non-blocking. However, the network of FIG. 2 cannot satisfy all the traffic requirements in FIG. 8. Therefore, the method of FIG. 1 is preferably employed in conjunction with the blocking network of FIG. 9.

EXAMPLE 1

The method of FIG. 1 is now employed in an attempt to expand the network of FIG. 2 such that the network of FIG. 2 can support the traffic requirement of FIG. 8 by using the blocking network of FIG. 9.

The initial link state matrix for Example 1 is shown in FIG. 10.

The operation of the method of FIG. 1 in this example is as follows:

Step 10—The node pair A,B is selected.

Step 20—According to FIG. 8, the traffic demands for the node pair A,B are 155 Mb/s+155 Mb/s+155 Mb/s.

Step 30—There are two routes between A and B: A, B and A, D, C, B.

Step 40—The best route is A, B if a path shortness criterion of optimization is used.

Step 50—Demand is not satisfied because only two 155 Mb/s links are available between A and B whereas 3 are required, assuming the given requirement includes traffic which is all following a single route. Therefore, the link state matrix is not updated.

Step 60—The method proceeds to step 80.

Step 80—The occupied segment of the route is, in this case, the entire route. It is assumed that a 155 Mb/s unsatisfied requirement justifies adding a new link of size 155 Mb/s from A to B. Therefore, the method proceeds to step 90.

Steps 90, 95—Switches A and B are scanned and the method determines that LN3, LN4, LN5 and LN6 are active unused links and therefore, a link LNX9 of size 155 Mb/s can be added between switches A and B if links LN4 and LN6 are inactivated.

Steps 100, 110, 120—Links LN4 and LN6 are inactivated and deleted from the link state matrix. Link LNX9 is added to the link state matrix. In the switch state matrix, the utilized capacities of switches A and B are each incremented by 155 Mb/s because link LNX9 has been added and are also decremented by the same amount because links LN4 and LN6 respectively have been inactivated. Therefore, in total, the utilized capacities of switches A and B in the switch state matrix remain the same.

The method now returns to step 30.

In step 30, all routes are now generated for the current network configuration. The possible routes are now still A,B and A, D, C, B.

Step 40—The next best route is A, B as before.

Step 50—The demand is now satisfied so the link state matrix is updated by replacing the zero values in the first three rows of Link Utilization column 5 with values of 155 Mb/s.

Step 60—The method proceeds to step 70.

Step 70—The selected routes are activated and the method returns to step 10 and selects the next node pair.

Step 10—In the present example, the traffic requirements are assumed, for simplicity, to be symmetric, and therefore the node pairs are, apart from A,B, only A, C; A, D;, B, C;, B, D; and C, D. It is appreciated that, more generally, the traffic requirements need not be symmetric.

In the present example, the next four node pairs to be selected are A, C; A, D;, B, C; and B, D respectively. Since the traffic requirement for each of these pairs is 0, the method of course finds that the demand is satisfied for each node pair trivially and proceeds to the last node pair, C, D.

The method now proceeds to analyze the C, D node pair similarly to the manner in which the A, B node pair was analyzed. The method concludes, similarly, that a new link, LNX10, of size 155 Mb/s, should be activated between switches C and D. In step 250, the demand is again deemed satisfied so the link state matrix is updated by replacing the zero values in the last three rows of Link Utilization column 5 with values of 155 Mb/s.

The final link state matrix is illustrated in FIG. 11.

Figure 7:
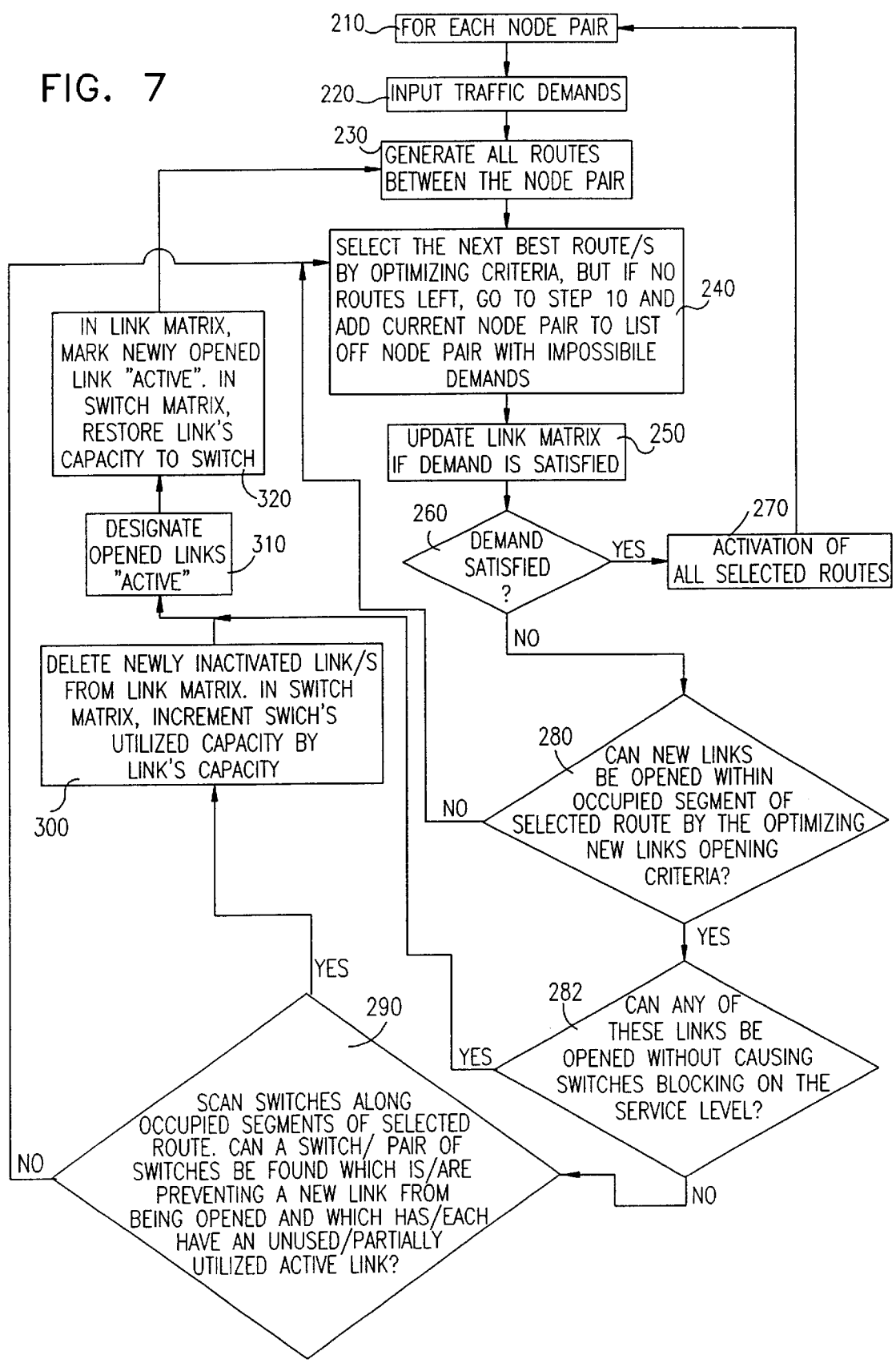
FIG. 7 is a simplified flowchart illustration of a method operative in accordance with one embodiment of the present invention for expanding a network by adding links as necessary to satisfy a given traffic requirement.

The blocking network of FIG. 9 may be generated by the method of FIG. 7 which is now described.

Reference is now made to FIG. 7 which is a simplified flowchart illustration of a preferred method for expanding a network by adding links as necessary to satisfy a given traffic requirement.

Steps 210–270 in the method of FIG. 7 are generally similar to steps 10–70 in the method of FIG. 1.

In step 280, the method determines whether it is worthwhile to open new links (i.e. whether links should be added) within the occupied segment of the selected route, in accordance with predetermined criteria of cost and/or utility for the proposed new link. This information is optionally received as an external input.

If step 280 determines that it is not worthwhile to open any new links along the occupied segment of the selected route, the method returns to step 240 and selects the next best route because the current best route is not feasible.

If step 280 determines that it is worthwhile to open a new link somewhere along the occupied segment of the selected route, the method proceeds to step 282. In step 282, the method inquires whether any of the proposed new links can be opened without causing any switch to block on the service level. If this is possible, these links are opened or activated (steps 310, 320).

If, however, none of the proposed new links can be opened without causing some switch or other to be blocking on the service level, then the method proceeds to step 290 which is similar to step 90 of FIG. 1. If the test of step 290 is not passed then the method returns to step 240 and selects the next best route because the current best route is not feasible.

If, however, the test of step 290 is passed then step 300 is performed which is generally similar to step 100 of FIG. 1.

It is appreciated that the applicability of the method of FIG. 7 is not limited to circuit switch networks but includes all other types of networks such as TDM and ATM networks.

FIG. 12 is an illustration of the switch state matrix for the ring network of FIG. 9 once the traffic requirement of FIG. 8 has been allocated thereto according to the method of FIG. 1.

Figure 13A:
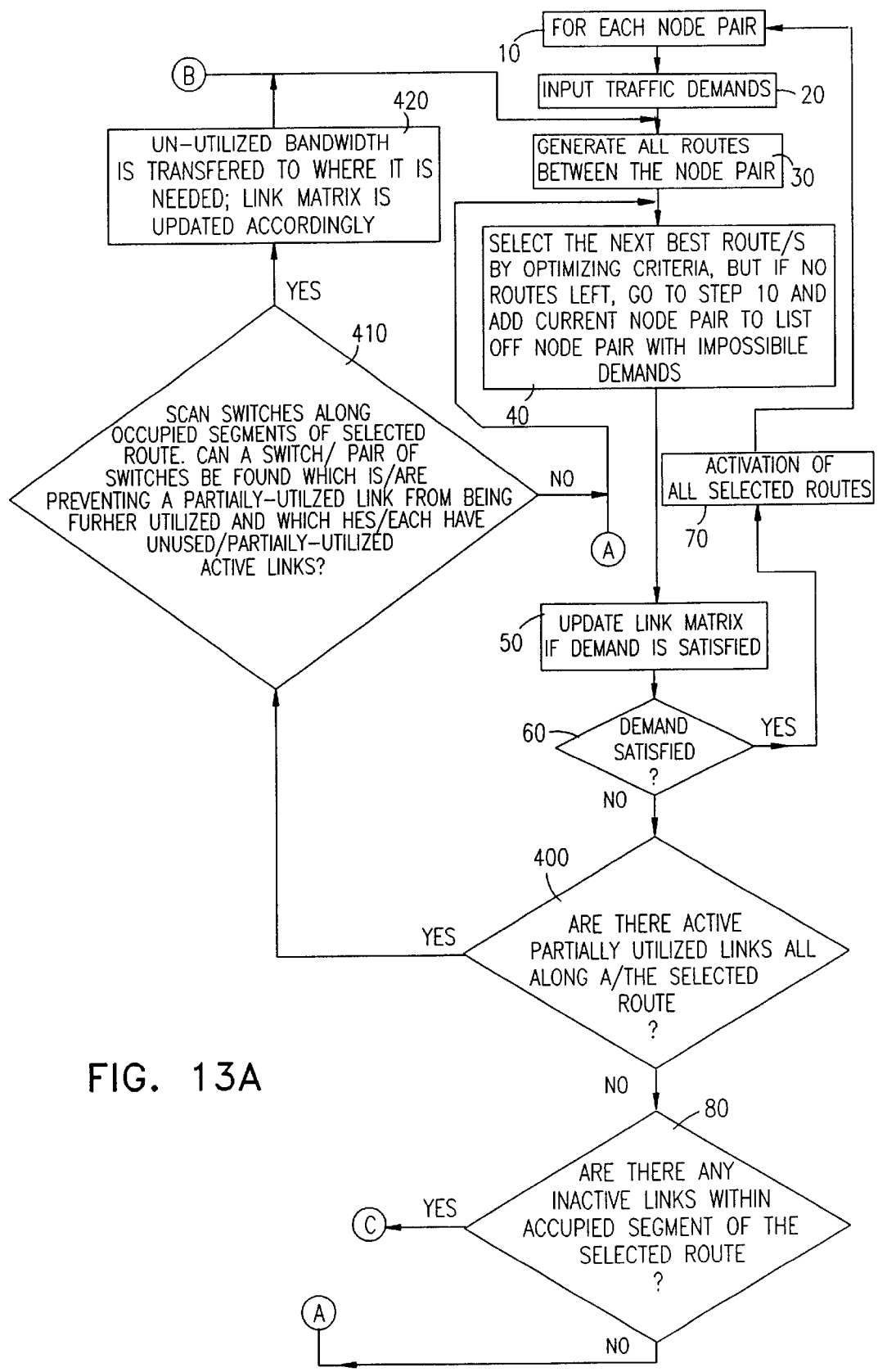
FIGS. 13A & B, taken together, form a simplified flowchart illustration of a method for allocating traffic to an ATM (asynchronous transfer mode) or TDM (time division multiplexing) blocking network.

Reference is now made to FIG. 13 which is a simplified flowchart illustration of a method for allocating traffic to an ATM or TDM blocking network.

The method of FIG. 13 is similar to the method of FIG. 1 with the exception that if a link is only partially utilized, it is possible to allocate to that link a proportional amount of the switch capacity, i.e. proportionally less than would be allocated if the link were completely utilized. In circuit switch applications, in contrast, the amount of switch capacity allocated to a link depends only on the link's capacity and not on the extent to which the link's capacity is actually utilized.

A new step 400 is added before step 80 in which an attempt is made to identify partially utilized active links so that a larger proportion of these can be utilized. If all of the active links are totally utilized, i.e. if none of the active links are only partially utilized, then the method proceeds to step 80.

If there is at least one active link which is only partially utilized then the method proceeds to new step 410.

In step 410, the method searches among switches along the occupied segment of the selected route which are preventing the partially utilized link or links from being further utilized. These switches are identifiable as those which are shown by the switch state matrix to be completely utilized. Among these switches, the method searches for those which have an active link which has unutilized bandwidth because the link is partially or wholly unutilized. If no such switch is found, the method returns to step 40 and selects the next best route since the current best route is not feasible.

If, however, such a switch is found, the method proceeds to new step 420 in which the following operations are performed:

The un-utilized bandwidth is "transferred" to where it is needed; and in the link state matrix, the link allocation column (e.g. FIG. 17, column 4), is incremented in the row which describes the link which is "accepting" the bandwidth. The link allocation column is decremented in the row which describes the link which is "contributing" the bandwidth.

The method now returns to step 30.

EXAMPLE 2

Figure 14:
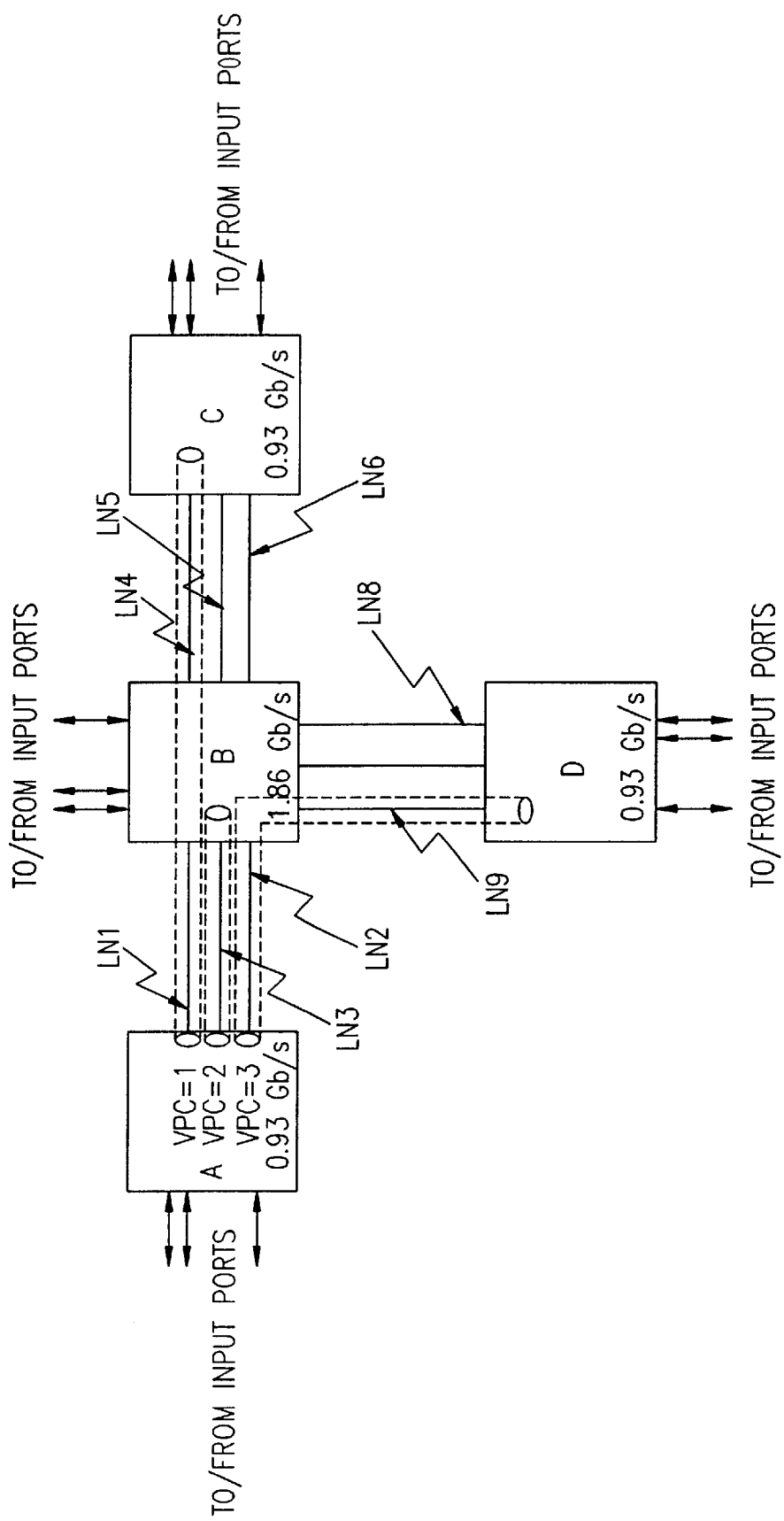
FIG. 14 is an illustration of a four node non-blocking network.

Given is a four node non-blocking network as illustrated in FIG. 14. Solid lines indicate physical links whereas virtual paths are indicated by dashed lines. The adjacency matrix of the network of FIG. 14 is illustrated in FIG. 15. The links connecting adjacent nodes in FIG. 14, LN1 to LN9, each have a capacity of 155 Mb/s. The application is assumed to be an ATM application.

The network of FIG. 14 satisfies the network traffic requirement illustrated in FIG. 16. Assuming there are three input ports per switch, all of the switches in FIG. 14 are non-blocking. Specifically, the capacities of switches A, C and D are 155 Mb/s×6=0.93 Gb/s and the capacity of switch B is 155 Mb/s×12=1.86 Gb/s.

The initial link state matrix is shown in FIG. 17, where the first column indicates the two switches connected by each link, the second column the link's ID, the third column indicates the link's capacity, the fourth column indicates the current traffic allocation to each virtual Path Identifier (VPI) in a given link. The fifth column typically indicates the extent to which the link is currently utilized. The six column indicates the state of the link (active or in-active) and the seventh column indicates each link's priority for activation.

The initial switch matrix for the above example is shown in FIG. 18 which satisfies the requirement matrix of FIG. 16.

Figure 20:
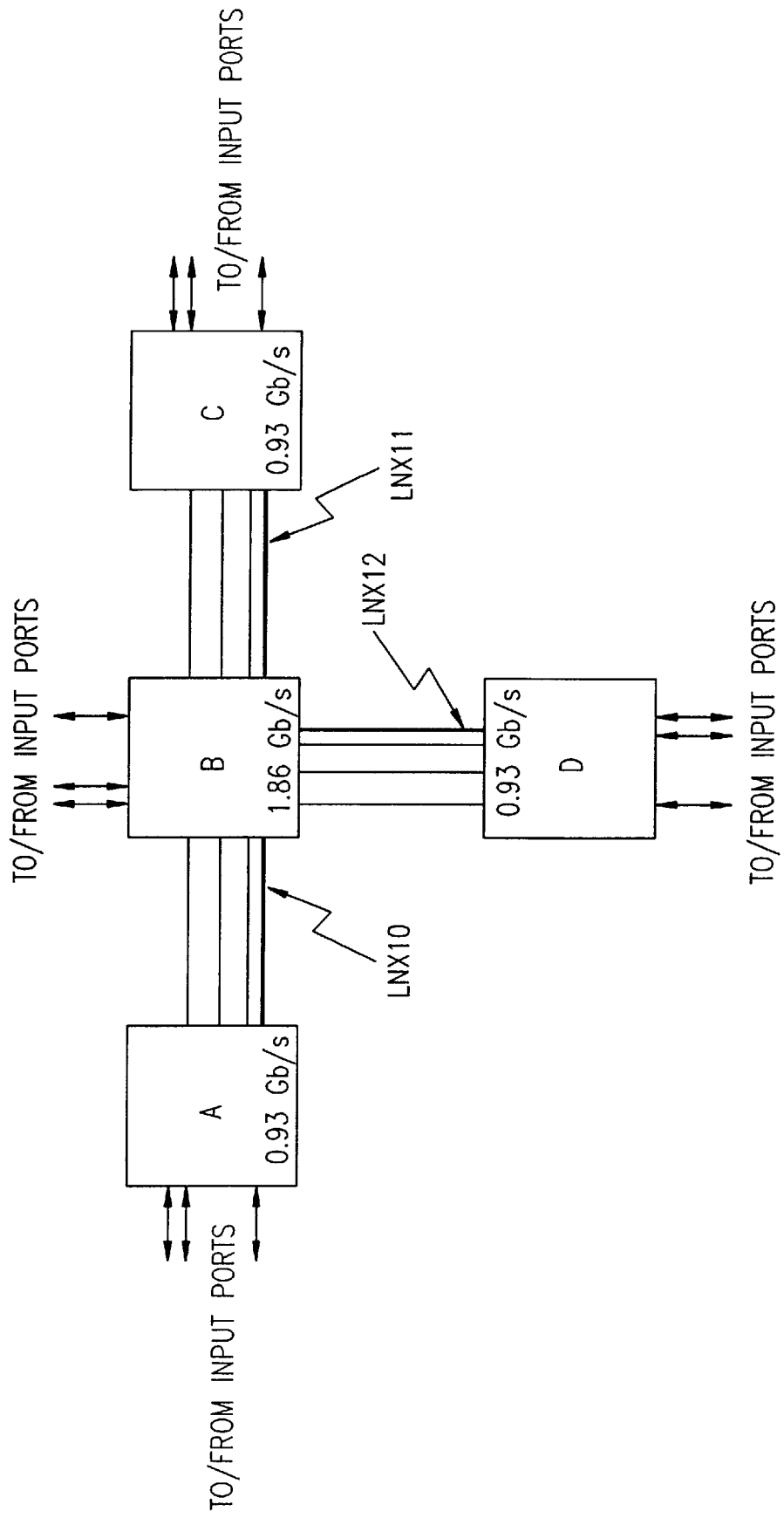
FIG. 20 is an illustration of a four node blocking network.

The network in FIG. 14 is non-blocking and remains non-blocking for the requirement shown in FIG. 16. However, the network of FIG. 14 cannot satisfy the additional traffic requirement of FIG. 19. Therefore, the blocking network of FIG. 20 is employed, initially carrying the traffic requirement of FIG. 16, and the link and switch states illustrated in the matrices of FIGS. 17 and 18 respectively. In FIG. 20, existing links are indicated by thin lines and new expansion links are indicated by heavy lines.

The method of FIG. 13 is employed in an attempt to expand the non-blocking network of FIG. 14 to function like the blocking network of FIG. 20 such that it can support the added traffic requirement of FIG. 19. The initial link state matrix, for Example 2 is shown in FIG. 21. The initial switch state matrix for Example 2 is shown in FIG. 18.

The operation of the method of FIG. 13 for this example is as follows:

Step 10—The node pair A, B is selected.

Step 20—According to the traffic demand matrix of FIG. 19, the traffic demand for A, B is 100 Mb/s.

Step 30—all routes are generated for the current network configuration. The possible routes include only A, B. Therefore, Step 40—The next best route is A, B.

Step 50—No active links are available to satisfy the demand illustrated in the matrix of FIG. 21.

Step 60—Demand is not satisfied and the method proceeds to step 400.

Step 400—Yes, there are active links that can be utilized. However, they can support only up to 155 Mb/s. Therefore, no active link with spare capacity is available and the method proceeds to step 80.

Step 80—Yes, there are links such as LNX10 as shown in FIG. 21. The method proceeds to step 90.

Step 90—Switches A and B scan their links for inactive bandwidth that would enable activation of the LNX10. Switch A has allocated three times 155 Mb/s, i.e. 465 Mb/s, whereas only 300 Mb/s is utilized as shown in FIG. 21, column 6. Therefore, the inactive link can be activated with 100 Mb/s and the links LN2 and LN3 are allocated only 100 Mb/s each. The method now proceeds to step 95.

Step 95—No active link has been deleted so no update is needed.

Steps 100, 110, 120 update the link LN2 such that its VPI ID is 2 and its capacity is 100, update the link LN3 such that its VPI ID is 3 and its capacity is 100, and update the link LNX10 such that its VPI ID is 4 and its capacity is 100. The switch matrix is updated accordingly and the method proceeds to step 30 to generate the routes. If, however, the step 95 is not passe then the method goes to step 40 to try the next best route.

Step 30—All route are now generated for current network configuration. There is only one possible route: A, B.

Step 40—The next best route is A, B.

Step 50—LNX10 is available with 100 Mb/s.

Step 60—Demand is satisfied and the method proceeds to step 70.

Step 70—The path is realized and activated an the method proceeds to step 10 and selects A, C.

The method proceeds to select the next traffic demand or requirements (step 10). The next node pair is A, C. The method preferably selects and tries to fulfill all remaining node pair requirements as shown in FIG. 19.

The method satisfied the remaining requirements between B,C and B, D. The remaining requirement cannot be fulfilled, due to the network blocking. The network link states, following operation of the method of FIG. 17 are shown in FIG. 22. Similarly, the node state matrix appears in FIG. 23.

Figure 24:
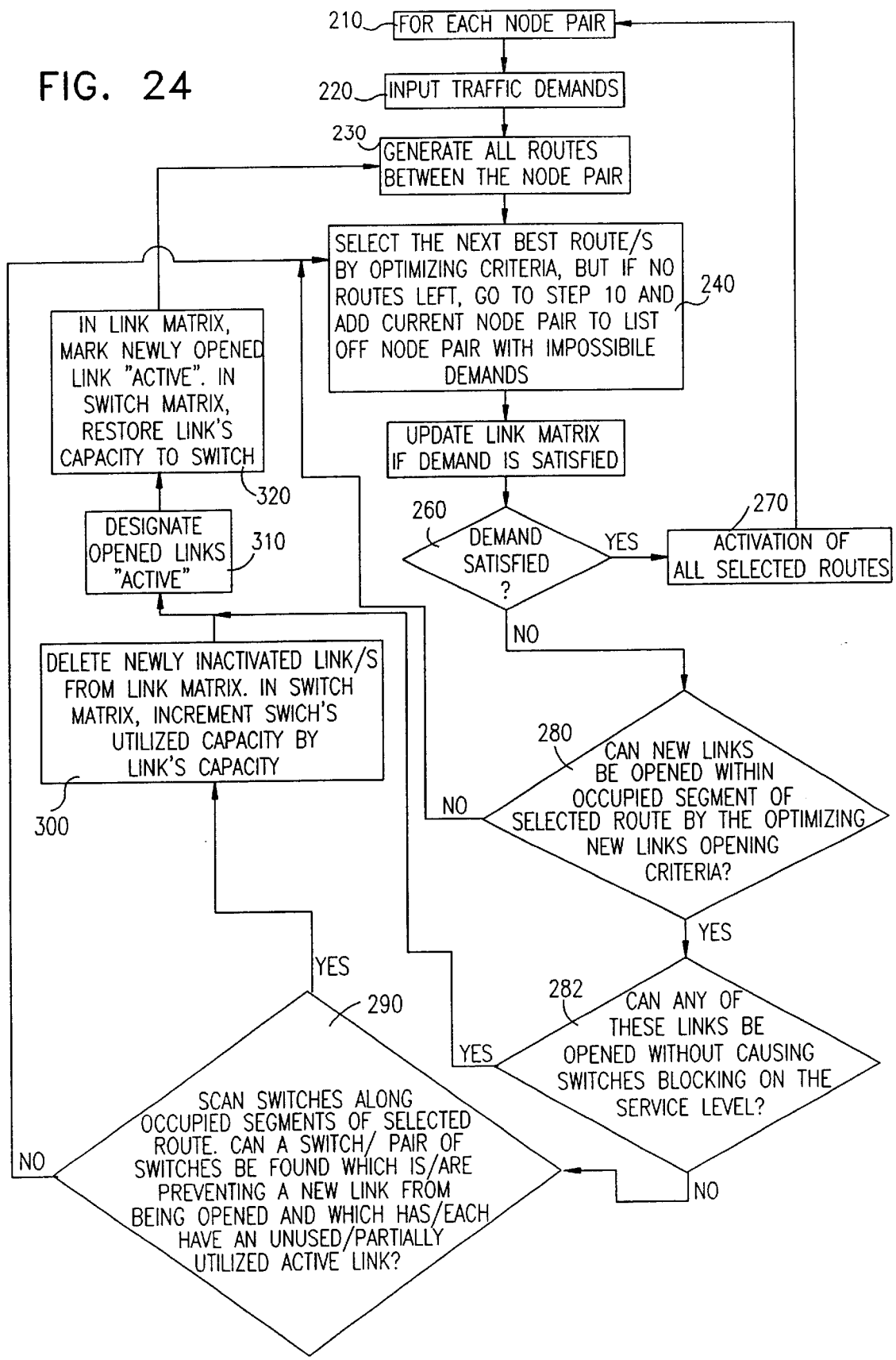
FIG. 24 is a modification of the method of FIG. 7 suitable for ATM and TDM networks.

The method of FIG. 7 may be employed to add links in ATM and TDM networks, if step 290 in FIG. 7 is modified, as shown in FIG. 24, to additionally take into consideration partially utilized links when evaluating whether to add new links. Using FIG. 24, a blocking version of FIG. 14 is generated, as shown in FIG. 20.

General capacity extended channels in communication networks provided in accordance with a preferred embodiment of the present invention are now described. This analysis was derived by Dr. Raphael Ben-Ami from BAR-NET Communication Intelligence Ltd, ISRAEL, and Professor David Peleg from the Department of Applied Mathematics and Computer Science, The Weizmann Institute of Science, Rehovot, 76100 ISRAEL. Professor David Peleg is not an inventor of the invention claimed herein.

A Introduction

One of the basic rules used for governing the design of most traditional communication networks is the capacity conservation rule for the network switches. Simply stated, this rule requires that the total capacity of incoming communication links connected to a switch must not exceed the switch capacity. (As the outgoing communication links connected to the switch have the same total capacity as the incoming links, the same applies to them as well.) This rule is desirable since it serves to prevent blocking situations, in which the total amount of traffic entering the switch exceeds its capacity, and consequently blocks the switch. In fact, the requirement of non-blocking cross-connection is adopted in a number of standards (cf. [Bel93, Bel95]).

The disadvantage of the capacity conservation rule is that it may in some cases cause poor utilization of the switch capacity. As long as traffic over the links entering and exiting the switch is well-balanced, the switch can be utilized up to its full capacity. However, if some of the incoming links are more heavily loaded than others (and the same for the outgoing links), then part of the switch capacity must remain unused.

This paper proposes a more flexible approach to capacity conservation and blocking prevention. The idea is to allow a switch of a given capacity c to be physically connected to links with total capacity exceeding c. Capacity conservation, and subsequently blocking prevention, should be enforced by locking some of the capacity of each link, at any given moment, and allowing it to use only part of its capacity. As the traffic pattern dynamically changes in the network, usable link capacities can be changed. This is done by locking some of the currently free capacity in lightly loaded links, and at the same time releasing some of the locked capacity in highly loaded links. At all times, the usable portions of the link capacities must preserve the capacity conservation rule.

This approach results in considerable improvements in the utilization of switches. Consider the common situation in which increases in the traffic requirements have brought the network to the stage where the traffic currently saturates the capacities of the network switches, with some traffic requirements unsatisfied. In this case it is necessary to expand the network in order to accommodate this additional traffic. Designing the network upgrade while insisting on following the traditional capacity conservation rule would force the network designer to increase the capacity in both the switches and links in question. In contrast, by switching to our more flexible conservation rule, considerable gains in the amount of traffic may be possible in some cases, by adding capacity only to the links, and utilizing the current switch capacities more efficiently.

(Let us remark that our approach is clearly beneficial also for the design of new networks. However, network expansions are increasingly becoming a more and more significant fraction of the market. This trend was identified in a recent study made by the Pelorus Group [Pel96]. According to this report, installations of expansion units in existing communication networks accounted for 40% of the installations of network units in 1996, and are expected to constitute the majority of the installations from 1998 on.)

In what follows, we begin (in the next section) by formally defining the network model we rely on, and then present formally the link expansion paradigm (in Section C). In Section D we provide some examples for the potential benefits in our approach. Section E presents the protocol used for dynamically controlling the available capacities of channels in the network as a function of continuous changes in the traffic patterns. Finally, Section F discusses the advantages of the proposed approach in ATM networks.

B The model

B.1 The Network Architecture

The model can be formalized as follows. The communication network connects n sites, $S_1, \ldots, S_n$. Each site $s_i$ is connected to the rest of the world via a communication switch, denoted $v_i$. The switches are connected by a network of some arbitrary topology. For the sake of generality, we assume that the links are unidirectional. Thus, each switch has a number of incoming links and a number of outgoing links. Formally, the topology of the network is represented by an underlying directed graph G=(V, E), were the vertex set $V=\{v_1, \ldots, v_n\}$ is the set of switches the network, and $E \subseteq V \times V$ is the collection of unidirectionl links connecting these switches (For notational convenience we may occasionally refer to the switch $v_i$ simply as i, and to the link $(v_i, v_j)$ as (i,j).). In addition, each switch $v_i$ always has both an incoming and an outgoing link to its local site $s_i$; the site transmits (and receives) all its traffic to (and from) other sites through these two links. Let E' denote the set of these links.

Figure 25:
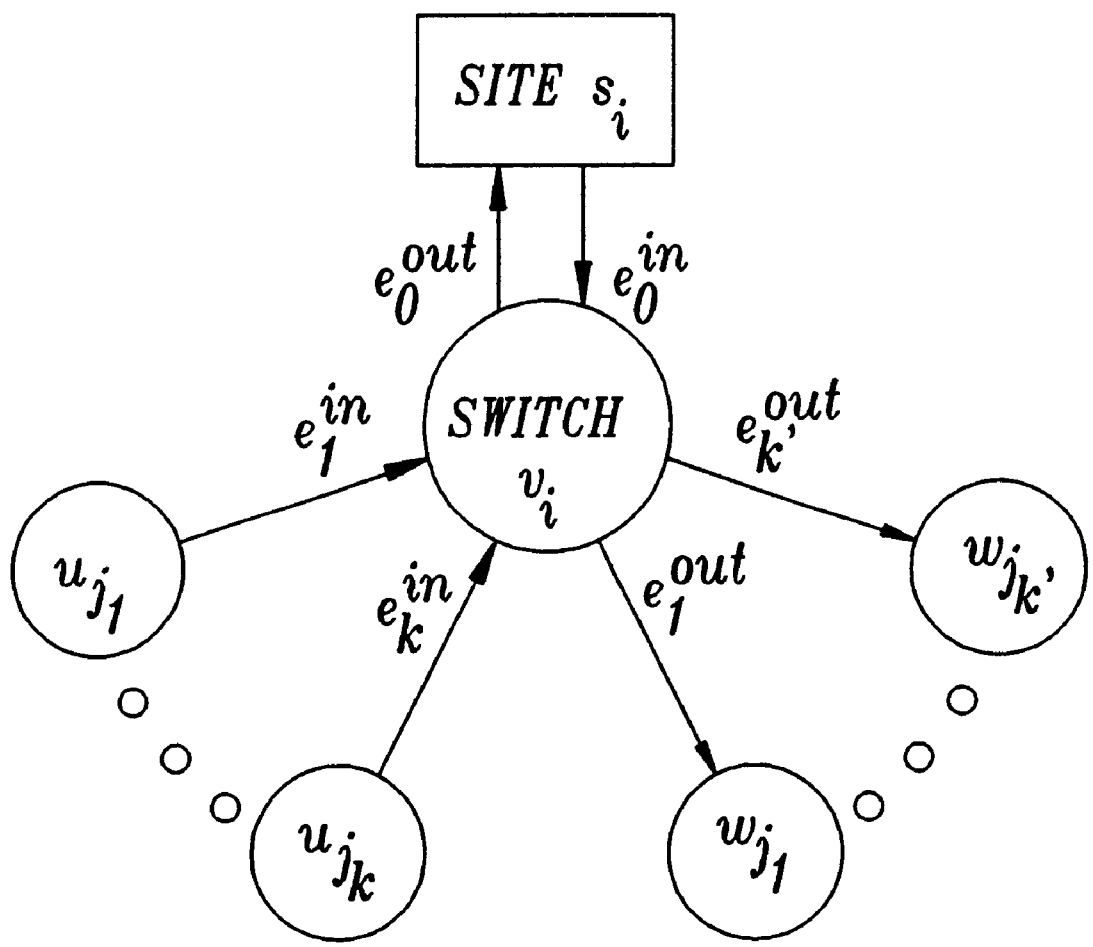
FIG. 25 is an illustration of the network connections of a communication switch $v_i$ attached to a site $s_i$.

Formally, we will adopt the following notation concerning the link structure of a switch $v_i$. Denote the links connecting it to its site $s_i$ by $e_0^{in}$ (for the link from $s_i$ to $v_i$) and $e_0^{out}$ (for the link from $v_i$ to $s_i$). We refer to these links as the site-switch links. Denote the remaining adjacent in going links of v by $e_l^{in}=(v_i, u_{jl})$ for $1 \leq l \leq k$, and the adjacent outgoing links by $e_l^{out}=(v_i, w_{jl})$ for $1 < l < k'$. These links are referred to as the inter-switch links, or simply the network links. The link structure of the switch $v_i$ is illustrated in FIG. 25.

Let us now turn to describe another major factor of the network design, namely, the capacity of switches and links. Each link e=(i,j) has a certain capacity c(e) associated with it (In reality, it is often the case that the links are bidirectional and have symmetric capacity, namely, c(i,j)=c(j,i). Likewise, it may often be assumed that the requirements are symmetric, namely, $r_{i,j}=r_{j,i}$.), bounding the maximum amount of traffic that can be transmitted on it from i to j. In addition to link capacities, each switch v of the network also has a capacity c(v) associated with it.

The standard model assumes that the capacities assigned to the edges connected to any particular switch sum up to no more than the capacity of that switch. Formally, each switch must obey the following rule.

Capacity Conservation Rule $$c(v) \geq \sum_{0 \leq l \leq k} c(e_l) = \sum_{0 \leq l \leq k'} c(e_l').$$

We shall refer to a network obeying this conservation rule as a conservative network.

B.2 Traffic Requirements and Routing

The traffic requirements among pairs of sites are specified by an n×n requirement matrix $R=(r_{i,j})$, where $r_{i,j}$ is the amount of traffic required to be transmitted from site $s_i$ to site $s_j$. (We will assume that traffic internal to the site $s_i$, i.e., between different clients in that site, is handled locally and does not go through the network, hence in the traffic requirement matrix R to be handled by the network, $r_{i,i}=0$ for every i.) Note that the traffic requirements matrix R can change dynamically with time, as the result of new user requests, session formations and disconnections, and so on.

Let us define the following notation concerning traffic requirements. For every site $s_i$, denote the total traffic originated (respectively, destined) at $s_i$ by $R_{out}(i) = \Sigma_j r_{i,j}$ (resp., $R_{in}(i) = \Sigma_j r_{j,i}$). Let $R_{sum}(i) = R_{out}(i) + R_{in}(i)$. For each of the subscripts sub, let $\hat{R}_{sub} = \max_i \{R_{sub}(i)\}$.

A given requirements matrix R is resolved by assigning to each pair of sites i, j a collection of routes from i to j, $\{\rho_{i,j}^1, \ldots, \rho_{i,j}^k\}$, over which the traffic $r_{i,j}$ will be split. That is, each path $\rho_{i,j}^l$ will carry $f_{i,j}^l$ units of traffic from i to j, such that $$\sum_{l \geq 1}^{k} f_{i,j}^l = r_{i,j}.$$

The collection of routes for all vertex pairs is denoted $\hat{\rho}$.

Once the routes are determined, we know exactly how much traffic will be transmitted over each edge and through each switch of the network. Specifically, given a route collection $\hat{\rho}$ and a network element $x \in V \cup E \cup E'$ (which may be either an edge e or a switch v), let $Q(x)$ denote the collection of routes going through x, $$Q(x) = \{(i,j,l) \mid x \text{ occurs on } \rho_{i,j}^l\}.$$

(Note that the switch v may never occur on a path as an end-point; all routes start and end at sites, and thus—formally speaking—outside the network.) Define the load induced by $\hat{\rho}$ on the network element $x \in V \cup E \cup E'$ (an edge or a switch) as $$q(x) = \sum_{(i,j,l) \in Q(x)} f_{i,j}^l.$$

Observe that the traffic flows in $v_i$ and its adjacent links must satisfy the following rule.
Flow Conservation Rule:

$$q(v_i) = \sum_{0 \leq l \leq k} q(e_l^{in}) = \sum_{0 \leq l \leq k'} q(e_l^{out}).$$

Moreover, $q(e_0^{in}) = R_{out}(i)$ and $q(e_0^{out}) = R_{in}(i)$, and subsequently, $$\sum_{1 \leq l \leq k} q(e_l^{in}) \geq R_{in}(i) \quad \text{and} \quad \sum_{1 \leq l \leq k'} q(e_l^{out}) \geq R_{out}(i)$$

(these inequalities might be strict, since the switch $v_i$ may participate in transmitting traffic belonging to other end-points as well). Consequently, $$q(v_i) \geq R_{in}(i) + R_{out}(i) = R_{sum}(i). \tag{1}$$

Clearly, in order for our link assignment to be feasible, the links and switches must satisfy the following rule.
Flow Feasibility Rule:
$q(x) \leq c(x)$ for each link or switch x.

In view of bound (2), this means that a requirement matrix R with $\hat{R}_{sum} > c$ cannot be satisfied at all, hence it suffices to consider matrices with $\hat{R}_{sum} \leq c$ (henceforth termed legal requirement matrices). Call a requirement matrix R maximal if $\hat{R}_{sum} = c$, namely, at least one of the switches saturates its capacity. Note that every matrix satisfying $\hat{R}_{sum} \leq c$ can be normalized so that it becomes maximal. Hence in what follows we shall concentrate on the behavior of networks on maximal requirement matrices.

C The Channel Expansion Model

The idea proposed in this paper is to expand the capacity of channels beyond that of the switch. At first sight, this may seem wasteful, as the potential traffic through a switch cannot exceed its capacity. Nonetheless, it is argued that such expansion may lead to increased total throughput under many natural scenarios, since allowing the total capacity of the links adjacent to a switch v to be at most the capacity of the switch means that it is only possible to fully utilize the switch if the route distribution is uniform over all the links. In practice, a given traffic requirement matrix may impose a non-uniform distribution of traffic over different links, and thus force the switch to utilize less than its full capacity. Increasing the capacity of the links would enable us to utilize the switch to its fullest capacity even when the traffic pattern is non-uniform.

It is important to note that the added channels need not be dedicated to potential expansion, but rather can be used for serving multiple functionalities in the network. For instance, the extra channel capacity can be used as protection lines, serving to protect against line failures. Moreover, some network designers are considering network with reserved bandwidth to reroute traffic in causes of failure. We claim that the expansion could be performed as well as considering bandwidth for reroute traffic in causes of failure.

A potential difficulty with a naive implementation of this idea is that it might violate the highly desirable non-blocking property required of communication switches. In order for a switch to be non-blocking, it is required to ensure that whenever an incoming link has free capacity, both the switch itself and (at least) one of its outgoing links can match it with free capacity of their own. This guarantees that it is impossible for incoming traffic to ever "get stuck" in the switch.

Hence in order to be able to utilize capacity expanded links, it is necessary to design the link-switch connection in a way that allows us to temporarily "lock" part of the link capacity, allowing the link to transmit only a fraction of its real capacity. Then, whenever a switch of capacity c is connected to links whose total capacity is c'>c, it is necessary to lock the extra link capacity, to a total of c'−c capacity units, and allow only a total capacity of c units to reach the switch.

Obviously, in order to enable us to take advantage of the extra capacity, the link locking mechanism must be reconfigurable, namely, allow changes in the fraction of locked capacity. This will allow the capacities of the links connected to a particular switch to be dynamically reconfigured at any given moment, according to the changes in traffic requirements. We will describe a protocol for dynamically controlling link capacities in the network in Section E.

Let us next present a formal definition for a communication network model supporting expanded capacity channels. The main change is that the capacity of each link e, c(e), is partitioned at any given time t into two parts, namely, the usable capacity $c_U^t(e)$ and the locked capacity $c_L^t(e)$. These two quantities may change over time, but at any given time t they must satisfy $$c_U^t(e) + c_L^t(e) = c(e).$$

At time t, the only part of the capacity that can be used for transferring traffic is the usable capacity; the locked part is effectively disconnected from the switch (by software means, although it is still physically attached to the switches), and cannot be utilized for traffic. That is, denoting the load on the link e at time t by q'(e), the flow feasibility rule for links becomes:

Modified Flow Feasibility Rule:

At any given time t, $q'(e) \leq c_U{}'(e)$ for each link e.

The capacity conservation rule observed by the switches must also be modified now, so that it refers only to usable capacity.

Modified Capacity Conservation Rule:

At any given time t, $$c(v) \geq \sum_{0 \leq l \leq k} c_U^t(e_l) = \sum_{0 \leq l \leq k'} c_U^t(e_l').$$

D Examples for Potential Benefits

Let us illustrate this idea via a number of simple examples. In these examples, the traffic pattern is semi-rigid, in the sense that the system remains under one traffic requirements matrix R for an extended period of time, and while this matrix is in effect, the traffic values behave precisely as prescribed by it (i.e., there are no significant traffic fluctuations). That is, traffic volume changes occur sparsely. Later on, we will discuss the way we handle dynamically changing systems. At this stage, let us only point out that it is clear that in a dynamic setting, the potential profits from the utilization of dynamic capacity expansions are even greater than in the semi-rigid setting.

D.1 Paired Traffic on the 4-node Clique

Figure 26A:
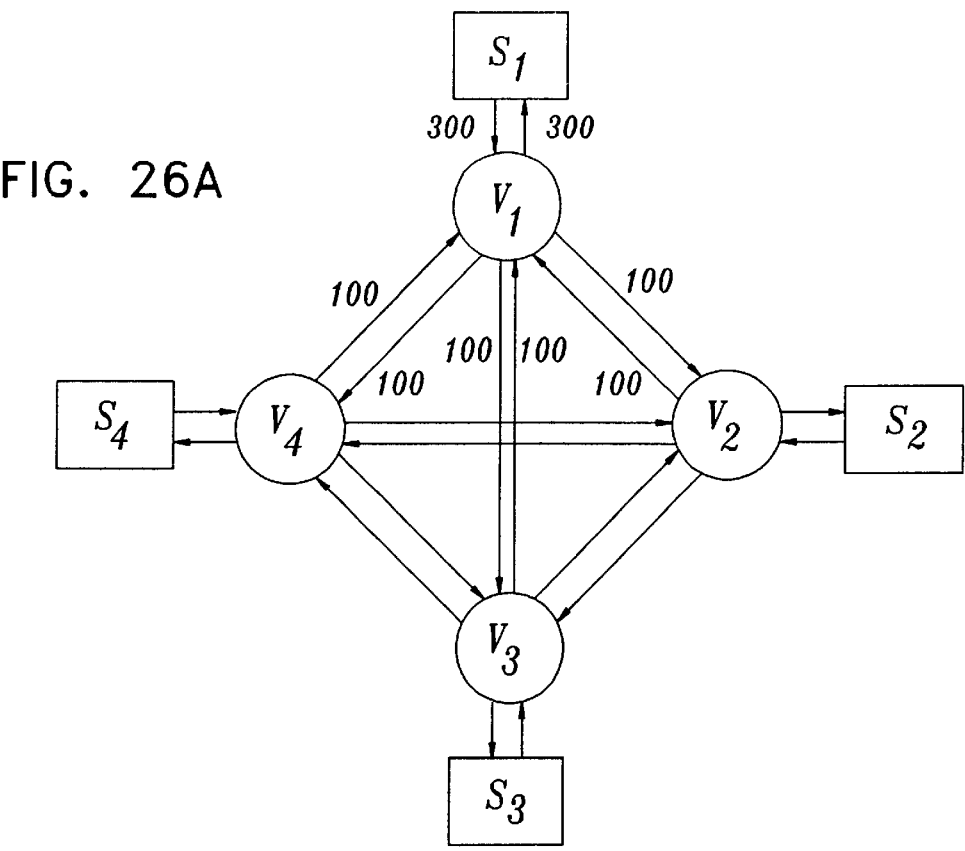
FIG. 26A is an illustration of a network topology based on the 4-vertex clique $C_4$, the numbers next to the links touching switch $v_1$ indicate their capacities.

Consider the complete network over four switches, $v_1$ to $V_4$, connecting the sites $s_1$ to $s_4$. Suppose that the capacity of each switch is 600, and that the network obeys the conservative model, allocating the link capacities as in FIG. 26(a).

Figure 26B:
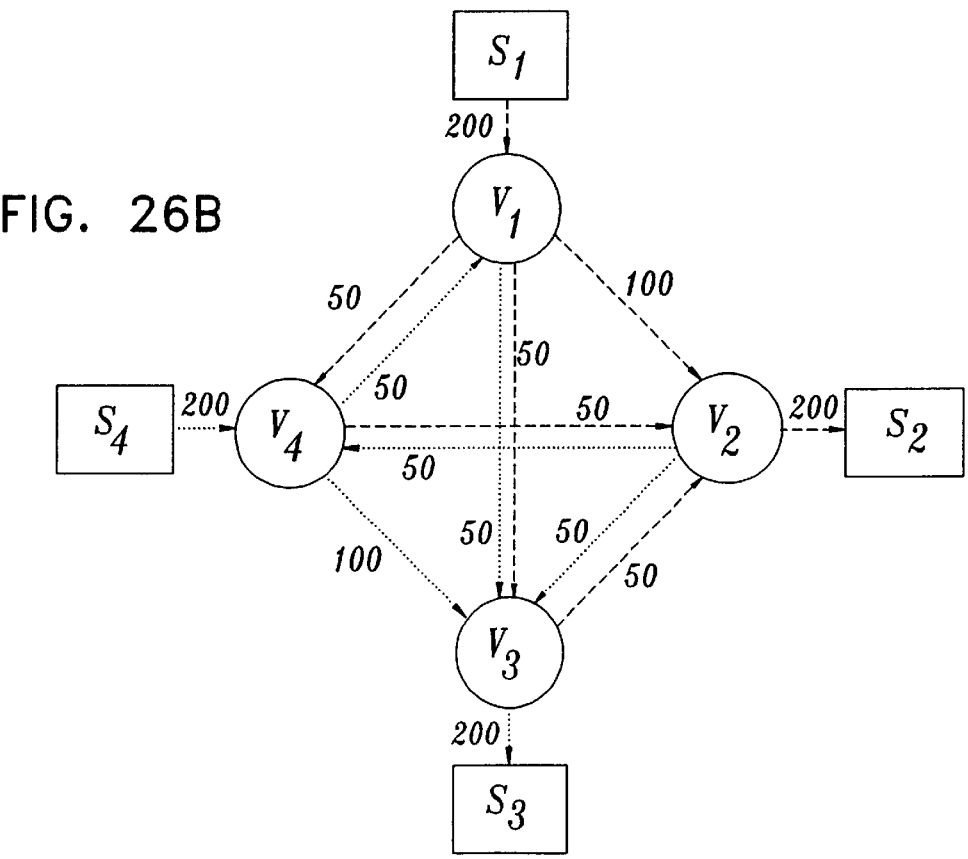
FIG. 26B is an illustration of a routing scheme for $C_4$ under a requirement matrix $R_0$, the numbers next to the links indicate the traffic flow they carry.

Suppose that at a given moment, it is required to establish communication of total volume 600 from $v_1$ to $v_2$ and from $v_4$ to $v_3$. In the given network, at most 100 units of the traffic from $v_1$ may proceed on the direct link ($v_1$, $v_2$), and the rest (in two equal parts of 50 units each) must follow paths of length 2, via the other two vertices. The same applies to the traffic from $v_4$ to $v_3$. Once this is done, all the edges leading from $v_1$ and $v_4$ to $v_2$ and $V_3$ are saturated (see FIG. 26 (b)).

Figure 27:
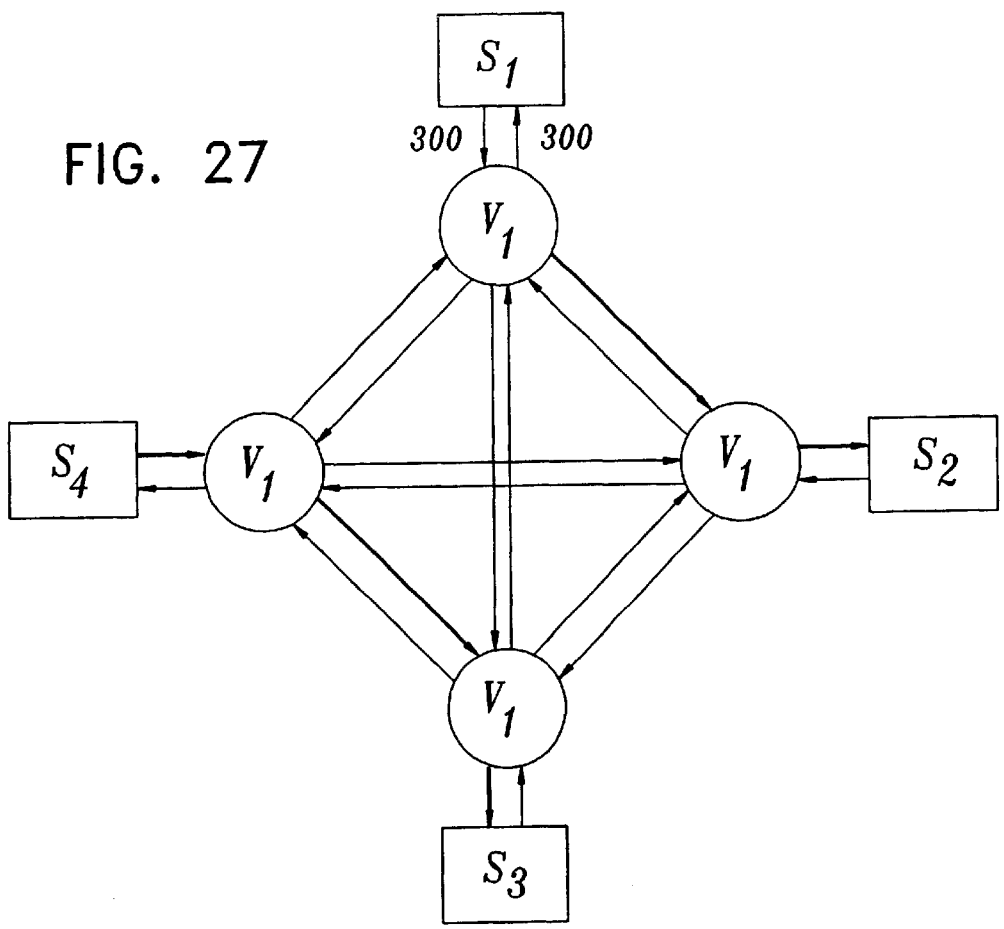
FIG. 27 is an illustration of an expanded network after reconfiguring to fit the traffic requirements.

In this case, if the network consists of capacity-expanded links, say, with capacity $c(e)=600$ for each link, then it is possible to route all requested traffic by reconfiguring the network so that the admissible capacities are as in FIG. 27.

D.2 Uniform Traffic on Small Ring Networks

Figure 28A:
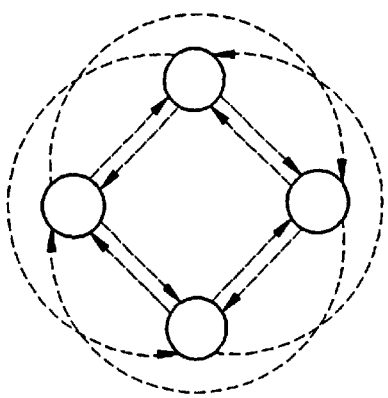
FIG. 28A is an illustration of a routing scheme for the 4-vertex ring, each dashed arc denotes a flow of 125 units.

Next, we consider the effects of expansion on ring networks of four and five nodes. Assume that the node capacities are 1000 units, traffic is uniform and network link capacities are 250 units each (i.e., the site-switch links have 500 unit capacities). Also assume that each node is required to send each other node a total of 167 units. Calculations presented elsewhere [BP96b] show that in the conservative setting (i.e., with no link expansion), only ¾ of this traffic, i.e., $f_{i,j}=125$ for every $1 \leq i,j \leq 4$, can be transmitted. At this point, the traffic saturates the inter-switch links, whose capacity is 250 units. (See FIG. 28(a)). Hence this traffic pattern causes a blocking of 25%. In contrast, expanding the ring network by a factor of 8/7, namely, increasing the link sizes to 286 units, will reduce the blocking to 14%, allowing a traffic of $f_{i,j}=143$ for every $1 \leq i,j \leq 4$.

Figure 28B:
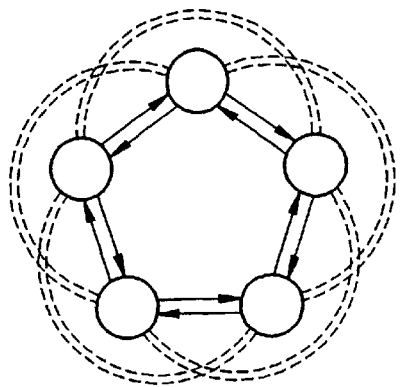
FIG. 28B is an illustration of a routing scheme for the 5-vertex ring, each dashed arc denotes a flow of 83 units.

Now consider the 5-vertex ring, under the same assumptions on capacities and traffic requirements. In the conservative model we have 33% blocking, with $f_{i,j}=83$ for every $1 \leq i,j \leq 5$. (See FIG. 28(b).) However, assuming the links are expanded by a factor of 6/5, i.e., their capacity becomes 300, it becomes possible to transmit 4/5 of the traffic, i.e., $f_{i,j}=100$ for every $1 \leq i,j \leq 5$, hence the blocking is reduced to 20%.

D.3 Uniform Traffic on a 21-node General Network

In the following example (see FIG. 29) we consider a larger network of 21 nodes, with each node connected to four other nodes. We assume a uniform traffic requirement matrix between the nodes, with each node sending 126 units of traffic to every other node. Further, we assume that the node capacity is 5040, and the capacity of each network link is 630 units (leaving 2520 units for the capacity of site-switch links). In the conservative setting, it is shown in [BP96b] that only 35 units can be sent between every pair of nodes ($f_{i,j}=35$ units for every $1 \leq i,j \leq 20$), as at that point the traffic saturates at the inter-switch link, whose capacity is 630 units. This means that 72% of the traffic is blocked.

This network can be expanded by increasing the network link capacities to 1296 units. This would enable each node to send up to 72 units of traffic to every other node, thus reducing the blocking to 43%.

E Dynamic Capacity Expansion Control

In this section we describe our approach to the problem of dynamically controlling the available capacities of channels in the network as a function of continuous changes in the traffic patterns. Specifically, we give a schematic description of a protocol whose task is to control the capacity expansions and reductions of channels in the network in response to dynamic requests for session formations or disconnections.

The capacity control protocol is in fact integrated with the route selection method used by the system. The method responds to connection requests issued by end users. Each such request includes the identities of the two endpoints, and a volume parameter representing the traffic volume expected to be transmitted between these endpoints (and hence, the size of the requested bandwidth slice).

Let us start with a high-level overview of the method. A new connection request $\sigma=(s_i, s_j, r)$, representing two end users from sites $s_i$ and $s_j$ requesting to form a session with r units of bandwidth, is handled as follows. First, a procedure PathGen is invoked, whose task is to generate candidate paths. Of those candidates, we then select a preferred route according to pre-specified optimization criteria. The choice of criteria is the subject of much discussion in the literature, and there is a wide range of design choices that can be made here, and are largely independent of our scheme, so we will make no attempt to specify them here. One parameter that is not taken into consideration at this stage, though, is feasibility. Namely, the protocol does not try to verify that the selected route has sufficient capacity at the moment in order to meet the entire demand specified by the request.

The selected route is now allocated to this session. At this point, the method checks to see what part of the request has been fulfilled. In case there is still an unsatisfied fraction of r' units, the method now tests to see whether it is possible to expand the congested segments of the selected route by the required amount. The congested segments of the route are defined as those links along the route whose flow is currently identical to their usable capacity.

Expanding the capacity of such a congested link e is done as follows. Suppose that e connects the vertices $v_1$ and $v_2$ along the selected route from $s_i$ to $s_j$. Suppose further that there exist some unsaturated edges emanating from $v_1$, i.e., edges whose current load is less than their usable capacity, and some unsaturated edges entering $v_2$.

Let $\Delta_1$ denote the total "free" (namely, usable but currently unused) capacity in the unsaturated outgoing links of $v_1$, and let $\Delta_2$ denote the total "free" capacity in the unsaturated ingoing links of $v_2$. Let $$\Delta = \min\{\Delta_1, \Delta_2, r', c_L{}'(e)\}.$$

We will only expand the capacity of e by $\Delta$ units. This is done as follows. First, unlock $\Delta$ units of capacity on link e, setting $c_L{}'(e) \leftarrow c_L{}'(e) - \Delta$ and $c_U{}'(e) \leftarrow c_U{}'(e) + \Delta$. At the same time, balance the capacities at the switches $v_1$ and $v_2$ by locking $\Delta$ units of capacity in the unsaturated outgoing edges of $v_1$ and in the unsaturated ingoing edges of $v_2$. Clearly, the conservation rules are maintained, and link e is now able to transmit $\Delta$ additional traffic units.

Of course, the traffic increase along the route depends on the least expandable link, namely, the link e for which $\Delta$ is smallest. If that $\Delta$ is strictly smaller than r', then the selected route cannot be expanded any more, and part of the traffic must be routed along some alternate routes.

Example

We illustrate the expansion process via an example, depicted in FIG. 30. In this example, the total capacity of network links is 12 units. The link e is congested as $q'(e) = c_U{}'(e) = 9$, but it still has some locked capacity ($c_L{}'(e) = 3$). Suppose that r'=2, i.e., two additional units of flow are needed along the route from $s_i$ to $s_j$. The only unsaturated edge emanating from $v_1$ is the edge $e_1$, for which $c_U{}'(e_1) = 10$ and $q'(e_1) = 8$. The only unsaturated edge entering $v_2$ is the edge $e_2$, for which $c_U{}'(e_2) = 10$ and $q'(e_2) = 5$.

Figure 31:
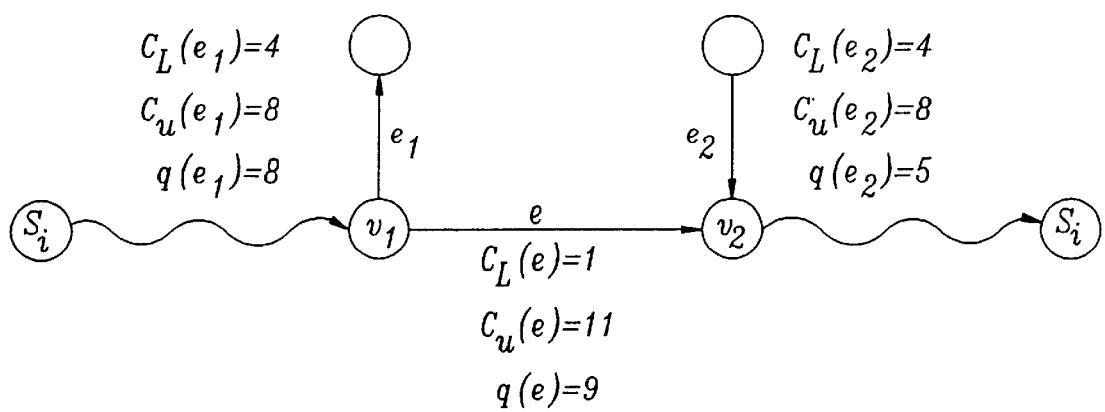
FIG. 31 is an illustration of the link capacities after redistribution operation.

Under these assumptions, $\Delta_1 = 2$ and $\Delta_2 = 5$, and hence $\Delta = 2$. Therefore, on e, it is possible to unlock 2 capacity units, thus setting $c_L{}'(e) \leftarrow 1$ and $c_U{}'(e) \leftarrow 11$. For $e_1$ and $e_2$ this entails setting $c_L{}'(e_1) \leftarrow c_L{}'(e) + 2$, $c_U{}'(e_1) \leftarrow c_U{}'(e) - 2$, $c_L{}'(e_2) \leftarrow c_L{}'(e) + 2$ and $c_U{}'(e_2) \leftarrow c_U{}'(e) - 2$. The resulting capacity distribution is depicted in FIG. 31.

F ATM Network Expansion

In an ATM network, a virtual path connection (VPC) is a labeled path which can be used to transport a bundle of virtual channel connections (VCC's), and to manage the resources used by these connections. Using the virtual path concept, the network is organized as a collection of VPC's which form a VPC, or a logical overlay network. Generally, the VPC can be either permanent or semi-permanent, and have a reserved capacity of the physical links. VPC provisioning activities include VPC topology and VPC capacity allocation decisions. VPC is defined in the standard [ITU], and plays a significant role in both traffic control and network resource management. Some of the main uses of the virtual path concept are for achieving simplified routing, adaptability to varying traffic and network failures through dynamic resource management, simple connection admission, and the ability to implement priority control by segregating traffic with different quality of service.

The extent to which VPC provisioning is able to improve efficiency is highly dependent on its ability to provide VCC's with low setup and switching costs, while maintaining low blocking probability for the required network connectivities. This, in turn, depends on the VPC topology and capacity allocation from resource management decisions.

In particular, the choice of VPC topology, or layout, greatly impacts the connection setup and switching costs, the network's resilience to unexpected traffic conditions and components failures, as well as the ability to change the topology when required. Generally, the VPC topology is affected by the physical network.

A main characteristic property of ATM networks that differentiates it from our previous model is the following. In an ATM network, two nodes A and B may be connected by a number of communication links (typically of the same type and capacity). However, each VPC must be allocated in its entirety via a single link along each segment of the path, i.e., splitting a VPC between two or more links is forbidden. (On the other hand, note that a given link can have several VPC's.)

This property affects the issue of capacity allocation discussed earlier, and complicates the derived solutions, particularly with regard to blocking. For instance, suppose that each of the links connecting the nodes A and B has fewer than X units of free capacity. Then a new VPC request requiring X capacity units cannot be accommodated, despite the fact that the total free capacity between A and B is much greater than needed.

This problem can be alleviated by expanding communication channels beyond the switch capacities. Such expansion can be achieved by adding some extra communication links. It is then possible to utilize extra space by fixing the usable capacity of each link to be precisely the used capacity, and locking the remaining capacity, thus freeing the available capacity of the switch for use via other links.

Figure 32:
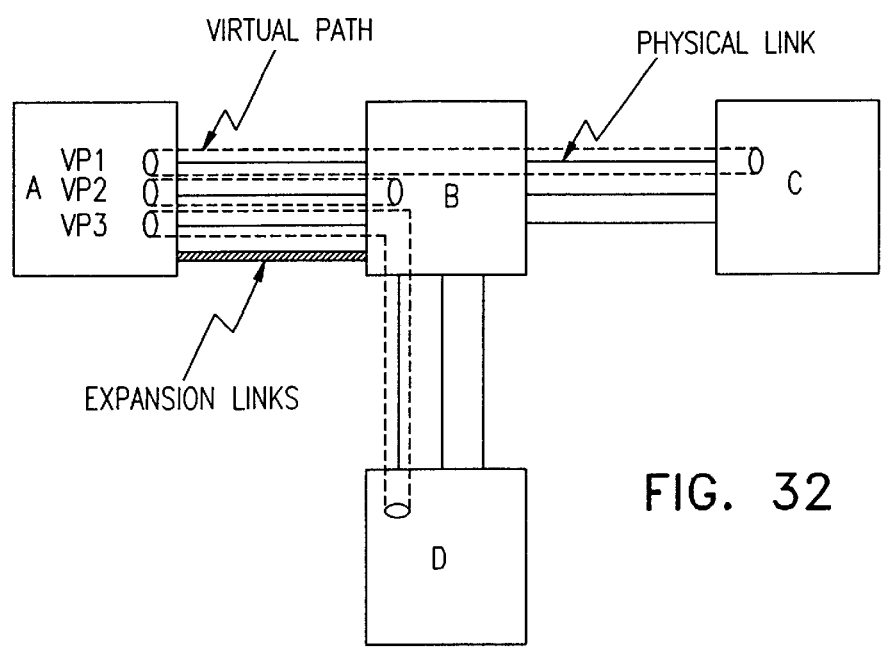
FIG. 32 is an illustration of an ATM expansion network example.

Let us illustrate this point by an example. FIG. 32 describes a four node ATM network, where each node has three links connecting to the neighboring nodes as shown. In the setting depicted in the example, each link emanating from node A belongs to sole VP. We assume that each link capacity is 155 Mb/s and the node capacity can support up to twelve 155 Mb/s links. Therefore each node is assigned three site-switch links and three links for each inter-switch connection it is involved in. (Hence the capacity of the links touching node B equals the node capacity, and the other nodes have superfluous capacity at the switches.)

Assume a traffic requirements matrix by which Node A has to send 100 Mb/s to each of the other three nodes B, C and D. Therefore, bandwidth allocation for these demands will result in the allocation of 100 Mb/s to VP1, VP2 and VP3. Note that a new request for a forth VPC of 100 Mb/s between any node pair cannot be satisfied, due to the non-splitting constraint on VPC's, despite the fact that sufficient capacity is available within the links to support all the demands. This will cause blocking in the network, which in the worse case can reach up to 30% of the network connectivity.

We resolve the blocking problem by expanding the network via adding a link (or several links) between any two connected nodes. These new links could utilize the remaining unused bandwidth for accommodating a new connection request. This is done by locking the usable capacity in the links serving the initial three VPC's on their currently used capacity of 100 Mb/s, and allocating free usable capacity in the amount requested to the new VPC over the currently unused links.

REFERENCES

[Bel93] Wideband and broadband digital cross-connect systems—generic criteria, Bell-core, publication TR-NWT-000233, Issue 3, November, 1993.

[Bel95] ATM functionality in SONET digital cross-connect systems—generic criteria, Bellcore, Generic Requirements CR-2891-CORE, Issue 1, August, 1995.

[BP96a] R. Ben-Ami and D. Peleg. Analysis of Capacity-Expanded Channels in a Complete Communication Network. Manuscript, 1996.

[BP96b] R. Ben-Ami and D. Peleg. Capacity-Expanded Channels in Communication Networks Under Uniform Traffic Requirements. Manuscript, 1996.

[Pel96] The Pelorus Group. Digital Cross-Connect Systems Strategies, Markets & Opportunities—Through 2000. Report, November, 1996.

[ITU] ITU-T Rec. I-375. Traffic Control and Congestion Control in B-ISDN. July 1995.

Computational relationships in capacity-extended channels in communication networks generally provided in accordance with a preferred embodiment of the present invention are now described. This analysis was derived by Dr. Raphael Ben-Ami from BARNET Communication Intelligence Ltd, ISRAEL, and Professor David Peleg from the Department of Applied Mathematics and Computer Science, The Weizmann Institute of Science, Rehovot, 76100 ISRAEL. Professor David Peleg is not an inventor of the invention claimed herein.

G The Network Model

The model can be formalized as follows. The communication network connects n sites, $s_1, \ldots, s_n$. The traffic requirements among pairs of sites are specified by an n×n requirement matrix $R=(r_{i,j})$, where $r_{i,j}$ is the amount of traffic required to be transmitted from site $s_i$ to site $s_j$. (We will assume that traffic internal to the site $s_i$, i.e., between different clients in that site, is handled locally and does not go through the network, hence in the traffic requirement matrix R to be handled by the network, $r_{i,i}=0$ for every i.)

Let us define the following notation concerning traffic requirements. For every site $s_i$, denote the total traffic originated (respectively, destined) at $s_i$ by $R_{out}(i)=\Sigma_j r_{i,j}$ (resp., $R_{in}(i)=\Sigma_j r_{j,i}$). Let $R_{sum}(i)=R_{out}(i)+R_{in}(i)$. For each of the subscripts sub, let $\hat{R}_{sub}=\max_i\{R_{sub}(i)\}$.

Each site $s_i$ is connected to the rest of the world via a communication switch, denoted $v_i$. The switches are connected by a network of some arbitrary topology. For the sake of generality, we assume that the links are unidirectional. Thus, each switch has a number of incoming links and a number of outgoing links. Formally, the topology of the network is represented by an underlying directed graph $G=(V,E)$, where the vertex set $V=\{v_1, \ldots, v_n\}$ is the set of switches the network, and $E \subseteq V \times V$ is the collection of unidirectional links connecting these switches (for notational convenience we may occasionally refer to the switch $v_i$ simply as i, and to the link $(v_i, v_j)$ as (i,j).). In addition, each switch $v_i$ always has both an incoming and an outgoing link to its local site $s_i$; the site transmits (and receives) all its traffic to (and from) other sites through these two links. Let E' denote the set of these links.

A given requirements matrix R is resolved by assigning to each pair of sites i, j a collection of routes from i to j, $\{\rho_{i,j}^1, \ldots, \rho_{i,j}^k\}$, over which the traffic $r_{i,j}$ will be split. That is, each path $\rho_{i,j}^l$ will carry $f_{i,j}^l$ units of traffic from i to j, such that $$\sum_{l=1}^{k} f_{i,j}^l = r_{i,j}.$$

The collection of routes for all vertex pairs is denoted $\hat{\rho}$.

Once the routes are determined, we know exactly how much traffic will be transmitted over each edge and through each switch of the network. Specifically, given a route collection $\hat{\rho}$ and a network element $x \in V \cup E \cup E'$ (which may be either an edge e or a switch v), let Q(x) denote the collection of routes going through x, $$Q(x)=\{(i,j,l) | \ x \text{ occurs on } \rho_{i,j}^l\}.$$

(Note that the switch v may never occur on a path as an end-point; all routes start and end at sites, and thus—formally speaking—outside the network.) Define the load induced by $\hat{\rho}$ on the network element $x \in V \cup E \cup E'$ (an edge or a switch) as $$q(x) = \sum_{(i,j,l) \in Q(x)} f_{i,j}^l.$$

Consider a switch $v_i$. Denote the links connecting it to its site $s_i$ by $e_0^{in}$ (for the link from $s_i$ to $v_i$) and $e_0^{out}$ (for the link from $v_i$ to $s_i$). Denote the remaining (network) adjacent ingoing links of v by $e_l^{in}=(v_i, u_{jl})$ for $1 \leq l \leq k$; and the adjacent outgoing links by $e_l^{out}=(v_i, w_{jl})$ for $1 \leq l \leq k'$ (see FIG. 25), Observe that the traffic flows in $v_i$ and its adjacent links must satisfy $$q(v_i) = \sum_{0 \leq l \leq k} q(e_l^{in}) = \sum_{0 \leq l \leq k'} q(e_l^{out}).$$

Moreover, $q(e_0^{in})=R_{out}(i)$ and $q(e_0^{out})=R_{in}(i)$, and subsequently, $$\sum_{1 \leq l \leq k} q(e_l^{in}) \geq R_{in}(i) \quad \text{and} \quad \sum_{1 \leq l \leq k'} q(e_l^{out}) \geq R_{out}(i)$$

(these inequalities might be strict, since the switch $v_i$ may participate in transmitting traffic belonging to other endpoints as well). Consequently, $$q(v_i) \geq R_{in}(i)+R_{out}(i)=R_{sum}(i). \quad (2)$$

Let us now turn to describe another major factor of the network design, namely, the capacity of switches and links. Each link e=(i,j) has a certain capacity c(e) associated with it (in reality, it is often the case that the links are bidirectional and have symmetric capacity, namely, c(i,j)=c(j,i). Likewise, it may often be assumed that the requirements are symmetric, namely, $r_{i,j}=r_{j,i}$.), bounding the maximum amount of traffic that can be transmitted on it from i to j. In addition to link capacities, each switch v of the network also has a capacity c(v) associated with it.

Clearly, in order for our link assignment to be feasible, each link or switch x must have at least q(x) capacity. In view of bound (2), this means that a requirement matrix R with $\hat{R}_{sum}>c$ cannot be satisfied at all, hence it suffices to consider matrices with $\hat{R}_{sum} \leq c$ (henceforth termed legal requirement matrices). Call a requirement matrix R maximal if $\hat{R}_{sum}=c$, namely, at least one of the switches saturates its capacity. Note that every matrix satisfying $\hat{R}_{sum} \leq c$ can be normalized so that it becomes maximal. Hence in what follows we shall concentrate on the behavior of networks on maximal requirement matrices.

The standard model assumes that the capacities assigned to the edges connected to any particular switch sum up precisely to the capacity of that switch, namely, $$c(v) = \sum_{0 \leq l \leq k} c(e_l) = \sum_{0 \leq l \leq k'} c(e_l').$$

We shall refer to a network obeying this conservation rule as a conservative network.

G.1 The Channel Expansion Model

The idea proposed in this paper is to expand the capacity of channels beyond that of the switch. At first sight, this may seem wasteful, as the potential traffic through a switch cannot exceed its capacity. Nonetheless, it is argued that such expansion may lead to increased total throughput under many natural scenarios, since allowing the total capacity of the links adjacent to a switch v to be at most the capacity of the switch means that it is only possible to fully utilize the switch if the route distribution is uniform over all the links. In practice, a given traffic requirement matrix may impose a non-uniform distribution of traffic over different links, and thus force the switch to utilize less than its full capacity. Increasing the capacity of the links would enable us to utilize the switch to its fullest capacity even when the traffic pattern is non-uniform.

Let us illustrate this idea via a simple example. Consider the complete network over four vertices, $v_1$ to $v_4$. Suppose that the capacity of each switch is c, and that it is required to establish communication with total volume c from $v_1$ to $v_4$. In the basic conservative network, the capacity of each of the links is only c/3, and therefore at most c/3 of the traffic from $v_1$ may proceed on the direct link ($v_1$, $v_4$), and the rest (in two equal parts of volume c/3 as well) must follow paths of length 2, via the other two vertices. Once this is done, the vertices $v_1$ and $v_2$ have already utilized all of their capacity, while the vertices $v_2$ and $v_3$ have already utilized c/3 of their capacity, so less is left for other traffic. In contrast, if the links were allowed to have greater capacity, say, c, then it would have been possible to send all traffic from $v_1$ to $v_4$ on the direct link between them. This would still exhaust the capacity at $v_1$ and $v_4$, but leave $v_2$ and $v_3$ unused, with all of their capacity intact.

To illustrate the profit potential of the channel expansion approach, we analyze the increase in throughput in a the following model. Given a network H, with its switch and link capacities, define the $\theta$-expanded network over H, denoted $E_\theta(H)$, by uniformly expanding (naturally, nonuniform expansions should be considered as well, but we leave that for future study.) the capacity of each link e to $\theta \cdot c(e)$. We will try to evaluate the transmission capability of the $\theta$-expanded network $E_\theta(H)$ w.r.t. the basic conservative network H, for $\theta > 1$ (for $\theta = 1$ the two networks coincide).

To evaluate the transmission level of a given network we will use the following parameter. For a network H and a requirement matrix R, define the R-transmission quality of H on R as $\alpha(H,R)=\max\{\alpha>0|$ requirement matrix $\alpha \cdot R$ can be satisfied on $H\}$, where $\alpha \cdot R$ is the requirement matrix ($\alpha \cdot r_{i,j}$), namely, multiplying the requirement $r_{i,j}$ for every pair i,j by $\alpha$.

Observe that for a maximal requirement matrix R, $0 < \alpha$ $(H,R) \leq 1$. Intuitively, the better the network H, the greater $\alpha(H,R)$ is. Hence we will be interested in the value of $\alpha(H,R)$ for the worst possible R. This leads to the following definition. For a network H, define the transmission quality of H as $\alpha(H)=\min_R\{\alpha(H,R)\}$.

For a conservative network H, it is natural to compare the transmission quality of the $\theta$-expanded network $E_\theta(H)$ with that of H, and examine the improvement in this quality due to the expansion. For the network H and the expansion factor $\theta$, we define the improvement ratio to be $$\gamma_\theta(H) = \max_R\left\{\frac{\alpha(\varepsilon_\theta(H), R)}{\alpha(H, R)}\right\}.$$

I.e., $\gamma_\theta(H)$ measures the maximum gain in transmission quality due to expanding the link capacity of the conservative network H by a factor of $\theta$. Clearly, this factor is always at least 1, and the higher it is, the more profitable it is to expand the capacity.

H Restricted Comparative Model

Let us start by analyzing the potential gains from the expansion of link capacities in a restricted and simplified model. We will consider a conservative network based on a $\Delta$-regular n-vertex undirected graph G (with each edge composed of two undirectional links, one in each direction). We will further assume that the switch capacities are uniform, namely, each of the vertices has capacity c. Similarly, we will assume that all network links are of the same capacity. More precisely, given a fixed parameter $0 \leq \tau \leq 1$, it is assumed that for every switch $v_i$, the links $e_0^{out}$ and $e_0^{in}$ connecting it to its site $s_i$ are of capacity $(1-\tau)c$, and every network link (connecting switch $v_i$ to switch $v_j$) is of capacity $\tau c/\Delta$. Denote the resulting conservative network over the underlying graph G (with the switch capacities determined by the parameter $\tau$) by $B(G, \tau)$. Denote the $\theta$-expanded network over $B(G, \tau)$ by $E_\theta(G, \tau)$, The natural extremal point for the expansion parameter $\theta$ is at $\theta = \Delta/\tau$, as the initial capacity of interswitch links in $B(G, \tau)$ is $\tau c/\Delta$, and it is pointless to expand the capacity of a link beyond c.

In this section we will focus on studying the properties of $E_\theta(G, \tau)$ for the complete n-vertex network $G=C_n$. Observe that for $\theta = \Delta/\tau = (n-1)/\tau$, the network $E_{n-1}(C_n, \tau)$ is capable of satisfying every legal requirement matrix, and hence in particular every maximal matrix, since for every i and j, the traffic $r_{i,j}$ from i to j can be transmitted (exclusively) on the direct link connecting them. Consequently $\alpha(E_{(n-1)/\tau}(C_n, \tau))=1$, and hence $\gamma_{(n-1)/\tau}(C_n, \tau)=1/\alpha(B(C_n, \tau))$. Hence to evaluate $\gamma_{(n-1)/\tau}(C_n, \tau)$ we shall need to derive bounds on $\alpha(B(C_n, \tau))$. More generally, we will now derive some (upper and lower) bounds on $\alpha(E_{74}(C_n, \tau))$ for values of $1 \leq \theta \leq (n-1)/\tau$.

H.1 Upper Bound

Lemma H.1

The transmission quality of the $\theta$-expanded network $E_\theta(C_n,\tau)$ is bounded above as follows.

1. For every $\tau \geq 2/3$, $$\alpha(\varepsilon_\theta(C_n, \tau)) \leq \begin{cases} \theta(1-\tau), & 1 \leq \theta \leq \frac{2}{3(1-\tau)}, \\ \frac{2}{3} + \frac{\tau\theta}{3(n-1)}, & \theta \geq \frac{2}{3(1-\tau)}. \end{cases}$$

2. For every $\tau \leq 2/3$, $$\alpha(\varepsilon_\theta(C_n, \tau)) \leq \begin{cases} \theta\tau/2, & 1 \leq \theta \leq \frac{4}{3\tau}, \\ \frac{2}{3} + \frac{\tau\theta}{3(n-1)}, & \theta \geq \frac{4}{3\tau}. \end{cases}$$

Proof

To prove the lemma, we have to show that there exists a maximal requirement matrix R, such that if the $\theta$-expanded network $E_\theta(C_n, \tau)$ can satisfy the traffic matrix $\alpha \cdot R$, then $\alpha$ is bounded above as in the lemma.

Assume n is even, and consider the following requirement matrix $R_M$ based on a matching among the sites (2i-1, 2i) for $1 \leq i \leq n/2$, with requirement c from 2i-1 to 2i. I.e., $r_{1,2}=r_{3,4}= \ldots =r_{n-1,n}=c$ and $r_{i,j}=0$ for all other pairs. This is a maximal matrix (in particular, for every odd vertex, $R_{out}(2i-1)=c$, and for every even vertex, $R_{in}(2i)=c$). We consider the traffic requirement matrix $\alpha \cdot R$ for some constant $0 < \alpha \leq 1$.

Let us examine the way in which this traffic requirement can be satisfied on the $\theta$-expanded network $E_\theta(C_n, \tau)$ for some fixed $0 \leq \tau \leq 1$. In particular, consider the traffic from $2i-1$ to $2i$, for some $1 \leq i \leq n/2$. A first immediate constraint on this traffic is that it must be transmitted from the site $s_{2i-1}$ to its switch $v_{2i-1}$ (and likewise, from the switch $v_{2i}$ to its site $s_{2i}$), and therefore the capacity of $e_{2i-1}^{out}$ and $e_{2i}^{in}$ must exceed $\alpha c$, i.e., $\theta(1-\tau)c \geq \alpha c$, or $$\alpha \leq \theta(1-\tau). \tag{3}$$

The volume of traffic that can be transmitted on the direct link from $2i-1$ to $2i$ is at most its capacity, $\theta\tau c/(n-1)$. All the remaining traffic must follow alternate routes, which must consist of at least two links and hence at least one additional intermediate switch.

Let $qv(i)$ denote the load (i.e., the total amount of traffic volume used) at all switches as a result of the traffic from $2i-1$ to $2i$. Then $$qv(i) \geq (3\alpha - \theta\tau/(n-1))c,$$

as a volume of $\alpha \cdot r_{2i-1,2i} = \alpha c$ is used at each of the endpoints $2i-1$ and $2i$, and in addition, a traffic volume of at least $\alpha c - \theta\tau c/(n-1)$ goes through alternate routes of length two or more, and hence must occupy at least one more switch.

Denoting the total volume used in switches for transmitting the matrix $R_M$ by $qv$ and noting that this value is bounded by the total switch capacities, we get that $$nc \geq q_V = \sum_i q_V(i) \geq \frac{n}{2}(3\alpha - \theta\tau/(n-1))c.$$

This gives us the following bound on $\alpha$:

$$\alpha \leq \frac{2}{3} + \frac{\theta\tau}{3(n-1)}. \tag{4}$$

Next, let us derive a bound on $\alpha$ based on link capacities. Consider the directed cut in the network separating the odd vertices from the even ones. The total capacity of the cut (in the direction from the odd to the even vertices) is $$\left(\frac{n}{2}\right)^2 \frac{\theta\tau c}{n-1}.$$

On the other hand, the total traffic requirements on this cut (from odd to even vertices) are $$\frac{n}{2} \cdot \alpha c.$$

Therefore, we must have $$\frac{\alpha c n}{2} \leq \frac{\theta\tau c n^2}{4(n-1)},$$

hence $\alpha \leq \theta\tau n/2(n-1)$. Fixing $\theta$ and $\tau$ and taking n to infinity we get the following bound on $\alpha$:

$$\alpha \leq \frac{\theta\tau}{2}. \tag{5}$$

The bounds expressed by inequalities (3) and (5) coincide when $\tau = 2/3$. In case $\tau < 2/3$, the bound expressed by inequality (3) is dominated by that of inequality (5). Finally, in case $\tau > 2/3$, the bound expressed by inequality (3) dominates that of inequality (5). Hence the bounds specified in the lemma follow. ∎

Figure 33:
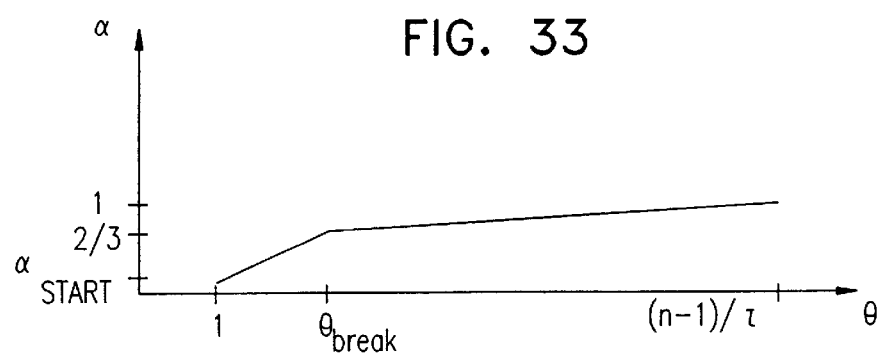
FIG. 33 is an illustration of the relationship between θ and $\alpha(\epsilon_\theta(C_n, \tau))$.

The relationship between the expansion factor $\theta$ and the transmission quality measure $\alpha(E_\theta(C_n))$ are expressed in the graphs of FIG. 33. Here $$\alpha_{start} = \begin{cases} 1-\tau, & \tau \geq 2/3, \\ \tau/2, & \tau \leq 2/3, \end{cases}$$

and $$\theta_{break} = \begin{cases} \dfrac{2}{3(1-\tau)}, & \tau \geq 2/3, \\ \dfrac{4}{3\tau}, & \tau \leq 2/3. \end{cases}$$

H.2 Lower Bound

Lemma H.2

The transmission quality of the $\theta$-expanded network $E_\theta(C_n, \tau)$ is bounded below as follows.

1. For every $\tau \geq 2/3$, $$\alpha(\varepsilon_\theta(C_n, \tau)) \geq \begin{cases} \theta(1-\tau), & 1 \leq \theta \leq \dfrac{2}{3(1-\tau)}, \\ \dfrac{2}{3} + \dfrac{(2\tau-1)\theta}{3n-5}, & \theta \geq \dfrac{2}{3(1-\tau)}. \end{cases}$$

2. For every $\tau \leq 2/3$, $$\alpha(\varepsilon_\theta(C_n, \tau)) \geq \begin{cases} \theta\tau/2, & 1 \leq \theta \leq \dfrac{4}{3\tau}, \\ \dfrac{2}{3} + \dfrac{\tau\theta}{2(3n-5)}, & \theta \geq \dfrac{4}{3\tau}. \end{cases}$$

Proof

Consider the $\theta$-expanded network $E_\theta(C_n, \tau)$ over the complete graph $C_n$ for some fixed $\tau$ and $\theta$. To prove the lemma, we need to show that for every maximal requirement matrix $R$, $E_\theta(C_n, \tau)$ can satisfy a traffic matrix $\alpha \cdot R$, where $\alpha$ is bounded below as in the lemma. Let $R$ be given. Observe that in order for a site $i$ to be able to send out the traffic it is required to send, we must have $\alpha R_{out}(i) \leq \theta(1-\tau)c$ and $\alpha R_{in}(i) \leq \theta(1-\tau)c$. As $\hat{R}_{sum} \leq c$, it is clear that in order to satisfy these two requirements it suffices to ensure that $$\alpha \leq \theta(1-\tau). \tag{6}$$

We select the routing as follows. For every pair $(i,j)$, the requirement $\alpha r_{i,j}$ from $i$ to $j$ will be transmitted as follows. Let x and y be parameters to be fixed later. First, a slice of volume $xr_{i,j}$ will be transmitted over the direct edge between them. In addition, for every switch $k \notin \{i,j\}$, a traffic slice of volume $yr_{i,j}$ will be transmitted over the length-2 path from i to k to j.

Let us now identify the requirements that x, y and $\alpha$ must satisfy in order for the specified routing to be valid. First, for every $i$ and $j$, the total traffic volume transmitted from i to j, which is $xr_{i,j} + (n-2)yr_{i,j}$, must exceed the requirement $\alpha r_{i,j}$, hence we get $$x + (n-2)y \geq \alpha. \tag{7}$$

Next, we need to ensure that the prescribed paths do not exceed the switch and link capacities available to the network. Let us first consider a switch $k$, and calculate the traffic volume going through it. This traffic first includes traffic for which $k$ is an endpoint, of volume $\alpha R_{sum}(k) \leq \alpha c$. In addition, the total traffic volume going through $k$ as an intermediate switch is $\Sigma_{i,j \neq k} y r_{i,j}$. Letting $Z = \Sigma_{i,j \neq k} r_{i,j}$, we note that $$Z = \sum_{i \neq k} \sum_{j \neq k} r_{i,j} =$$

$$\sum_{i \neq k} (R_{out}(i) - r_{i,k}) = \sum_{i \neq k} R_{out}(i) - \sum_{i \neq k} r_{i,k} = \sum_{i \neq k} R_{out}(i) - R_{in}(k).$$

By a similar argument we also have $Z = \Sigma_{i \neq k} R_{in}(i) - R_{out}(k)$. Put together, we get that $$Z = \frac{1}{2}\left(\sum_{i \neq k} R_{sum}(i) - R_{sum}(k)\right) \leq \frac{1}{2}\sum_{i \neq k} R_{sum}(i) \leq \frac{1}{2}(n-1)\hat{R}_{sum} \leq (n-1)c/2.$$

Therefore the total traffic in the switch is bounded by $yZ + \alpha c = (y(n-1)/2 + \alpha)c$, and it is necessary to ensure that this volume is smaller than the switch capacity, which is c, namely, that $$y(n-1)/2 + \alpha \leq 1. \tag{8}$$

Finally, we need to ensure that the prescribed paths do not exceed the link capacities available to the network. Consider a link $e = (i,j)$, and calculate the traffic volume going through it. This traffic first includes a volume of $xr_{i,j}$ of direct traffic from $s_i$ to $s_j$. In addition, for every other switch k, the link e transmits traffic of volume $yr_{k,j}$ along a route from k to j, and traffic of volume $yr_{i,k}$ along a route from i to k. Thus the total volume of traffic over e is $$q(e) = xr_{i,j} + y\sum_{k \neq i,j}(r_{i,k} + r_{k,j}) = xr_{i,j} + y(R_{out}(i) - r_{i,j}) + y(R_{in}(j) - r_{i,j})$$

$$= (x - 2y)r_{i,j} + y(R_{out}(i) + R_{in}(j)) \leq (x - 2y)r_{i,j} + 2yc.$$

Hence to verify that this volume is smaller than the link capacity, we have to ensure that $$(x-2y)r_{i,j} + 2yc \leq \theta\tau c/(n-1). \tag{9}$$

Restricting ourselves to a choice of x and y satisfying $$2y \leq x \tag{10}$$

allows us, noting that $r_{i,j} \leq c$, to replace requirement (9) by the stronger one $$(x-2y)c + 2yc \leq \theta\tau c/(n-1),$$

or $$x \leq \theta\tau/(n-1). \tag{11}$$

Thus any choice of x, y, $\alpha$ satisfying constraints (6), (7), (8), (10) and (11) will yield a valid routing satisfying the requirement $\alpha \cdot R$.

Let us fix $x = \theta\tau/(n-1)$ and thus satisfy constraint (11), and get rid of the occurrence of x in constraints (7) and (10). Rewriting constraints (7), (8) and (10) as $$y \geq \frac{\alpha - \theta\tau/(n-1)}{(n-2)},$$

$$y \leq \frac{2(1-\alpha)}{(n-1)},$$

-continued $$y \leq \frac{\theta\tau}{2(n-1)}.$$

we see that in order for a solution y to exist, we must have the following two inequalities:

$$\frac{\alpha - \theta\tau/(n-1)}{(n-2)} \leq \frac{2(1-\alpha)}{(n-1)},$$

$$\frac{\alpha - \theta\tau/(n-1)}{(n-2)} \leq \frac{\theta\tau}{2(n-1)}.$$

Rearranging, we get $$\alpha \leq \frac{2n - 4 + \theta\tau}{3n - 5} \tag{12}$$

$$\alpha \leq \frac{\theta\tau n}{2(n-1)} \tag{13}$$

Noting that $$\theta\tau/2 \leq \frac{\theta\tau n}{2(n-1)},$$

we strengthen constraint (13) by requiring $\alpha$ to satisfy $$\alpha \leq \theta\tau/2. \tag{14}$$

We are left with a set of three constraints, (6), (12) and (14), such that any choice of $\alpha$ satisfying all three is achievable (i.e., the requirement matrix $\alpha \cdot R$ can be satisfied). The breakpoint between constraints (6) and (14) is for $\tau = 2/3$. Let us first consider the case $\tau \geq 2/3$. In this case, constraint (6) dominates (14). Further, in the range of $$1 \leq \theta \leq \frac{2}{3(1-\tau)}$$

constraint (6) dominates also constraint (12), hence the best that can be achieved is $\alpha = \theta(1-\tau)$. In the range of $$\theta \geq \frac{2}{3(1-\tau)}$$

constraint (12) is dominant, and it is possible to achieve $$\alpha = \frac{2n - 4 + \theta\tau}{3n - 5}.$$

Noting that in this range (of $\tau \geq 2/3$) we have $$\frac{2}{3} + \frac{\theta(2\tau - 1)}{3n - 5} \leq \frac{2n - 4 + \theta\tau}{3n - 5},$$

the first claim of the lemma follows.

Let us next consider the case $\tau \leq 2/3$. In this case, constraint (14) dominates (6). Further, in the range of $$1 \leq \theta \leq \frac{4}{3\tau}$$

constraint (14) dominates also constraint (12), hence the best that can be achieved is $\alpha = \theta\tau/2$. In the range of $$\theta \geq \frac{4}{3\tau}$$

constraint (12) is dominant, and again it is possible to achieve $$\alpha = \frac{2n-4+\theta\tau}{3n-5}.$$

Note that in This range (of $\tau \leq 2/3$) we have $$\frac{2}{3} + \frac{\theta\tau}{2(3n-5)} \leq \frac{2n-4+\theta\tau}{3n-5},$$

and hence the second claim follows as well. ∎

H.3 Extending the Transmission Capability by k

Suppose we wish to expand the transmission capability of the complete network by a large factor k. It seems from our discussion that the most efficient way to do so would be as follows. Start by expanding only the edge capacities by a factor of $\theta_{break}$. From that point and on, continue by expanding both edge and switch capacities uniformly (by a factor of $k/\theta_{break}$). Overall, the edges are expanded by a factor of k, whereas the switches are expanded only by a factor of $k/\theta_{break}$.

Computational relationships in capacity-extended channels in communication, specifically under uniform traffic requirements provided in accordance with a preferred embodiment of the present invention are now described. This analysis was derived by Dr. Raphael Ben-Ami from BARNET Communication Intelligence Ltd, ISRAEL, and Professor David Peleg from the Department of Applied Mathematics and Computer Science, The Weizmann Institute of Science, Rehovot, 76100 ISRAEL. Professor David Peleg is not an inventor of the invention claimed herein.

I Analysis of Uniform Traffic Requirements

We now analyze the potential gains from the expansion of link capacities in the same model studied before, but under the assumption that the requirements matrix is $R^U$, characterized by $$r_{i,j} = \frac{c}{2(n-1)}.$$

This is a maximal matrix, as for every switch $v_i$ we have $$R_{out}(i) = R_{in}(i) = (n-1) \times \frac{c}{2(n-1)},$$

hence $R_{sum}(i)=c$. We will now derive some tight bounds on $\alpha(E_\theta(G,\tau))$ for various values of $\theta$ and various simple regular topologies G.

Figure 34:
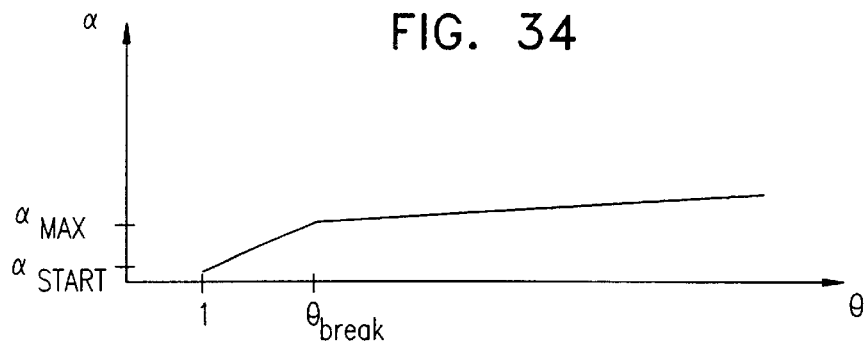
FIG. 34 is an illustration of the relationship between θ and $\alpha(\epsilon_\theta(C_n, \tau))$.

Let us remark that as it turns out, in all of the cases examined, the general dependency of $\alpha(E_\theta(G,\tau))$ on $\theta$ looks as in the graph of FIG. 34, or more formally, $$\alpha(\varepsilon_\theta(G,\tau)) = \begin{cases} \alpha_{start} \cdot \theta, & 1 \leq \theta \leq \theta_{break}, \\ \alpha_{max}, & \theta \geq \theta_{break}, \end{cases}$$

where $\alpha_{max}=\alpha_{start} \cdot \theta_{break}$ and the values of $\alpha_{start}$, $\alpha_{max}$ and $\theta_{break}$ depend on the specific topology at hand (as well as on $\tau$). In what follows we refer to this type of function as a plateau function, and denote it by Plateau($\alpha_{start}$, $\alpha_{max}$).

(In most of our bounds, the description of the function is slightly complicated by the fact that $\alpha_{start}$ is dependent on the value of $\tau$; in particular, it assumes a different value according to whether $\tau$ is smaller or greater than some threshold value $\tau_{break}$.)

I.1 The Complete Network

Lemma I.1

The transmission quality of the $\theta$-expanded network $E_\theta(C_n,\tau)$ under the uniform requirements matrix $R^U$ is $\alpha(E_\theta(C_n, \tau))$=Plateau($\alpha_{start}$, $\alpha_{max}$) where $\alpha_{start}$=2 min $\{\tau, 1-\tau\}$ and $\alpha_{max}$=1.

Proof

Since $R^U$ is uniform and and the underlying network is complete, it is easy to verify by symmetry arguments that the most efficient solution would be to transmit the traffic from i to j along a single path, namely, the direct edge connecting them. The requirement that the edge capacity suffices for the intended traffic translates for an inter-switch edge into the inequality $$\frac{\theta\tau c}{n-1} \geq \frac{\alpha c}{2(n-1)}, \quad (15)$$

$$\alpha \leq 2\theta\tau.$$

For a site-switch edge we get the inequality $\theta(1-\tau)c \geq \alpha c/2$, or $$\alpha \leq 2\theta(1-\tau). \quad (16)$$

The choice of routes ensures that the switch capacity suffices for transmitting the entire requirement for a maximal matrix, and nothing more, namely, $$\alpha \leq 1. \quad (17)$$

The bounds expressed by inequalities (15) and (16) coincide when $\tau=1/2$. In case $\tau<1/2$, the bound expressed by inequality (16) is dominated by that of inequality (15), and the opposite holds in case $\tau>1/2$. Hence the bounds specified in the lemma follow. ∎

I.2 Rings

Let us next consider the simple ring topology R. For simplicity of presentation we assume that n is odd, and the switches are numbered consecutively by 0 through n−1.

Lemma I.2

The transmission quality of the $\theta$-expanded n-site network $E_\theta(R, \tau)$ (for odd n) under the uniform requirements matrix $R^u$ is $\alpha(E_\theta(R, \tau))$=Plateau($\alpha_{start}$, $\alpha_{max}$), where $$\alpha_{max} = \frac{8}{n+5} \text{ and}$$

$$\alpha_{start} = \begin{cases} \frac{8\tau}{n+1}, & \tau \leq \tau_{break}, \\ 2(1-\tau), & \tau_{break} \leq \tau \leq 1, \end{cases} \text{ for}$$

$$\tau_{break} = \frac{n+1}{n+5}.$$

Proof

Again, by symmetry considerations we can show that the best solution is obtained if one transmits the traffic from $s_i$ to $s_j$ along the shorter of the two paths connecting them on the ring, for every i and j. We now have to estimate the loads on switches and links under this routing pattern.

Let us sum the total traffic load on the ring edges. Consider first the traffic originated at site $s_i$. For every $1 \leq j \leq (n-1)/2$, there are two routes of length j out of $s_i$ (one clockwise and one counterclockwise). Each such route loads j edges with $\alpha c/2(n-1)$ traffic. Hence the total traffic load generated by $s_i$ is $$\sum_{j=1}^{(n-1)/2} 2j \cdot \frac{\alpha c}{2(n-1)} = \frac{(n+1)\alpha c}{8},$$

and the total traffic load overall is $n(n+1)\alpha c/8$. As this load distributes evenly among the 2n directed links, the load on each link of the ring is $(n+1)\alpha c/16$. This must be bounded by the link capacity, hence we get $$\frac{\theta \tau c}{2} \geq \frac{(n+1)\alpha c}{16}, \quad \text{or} \tag{18}$$

$$\alpha \leq \frac{8\theta\tau}{(n+1)}.$$

A similar calculation should be performed for the switches. Again, we first consider the traffic originated at site $s_i$. For every $1 \leq j \leq (n-1)/2$, there are two routes of length j out of $s_i$. Each such route loads j+1 sites (including the endpoints) with $\alpha c/2(n-1)$ traffic. Hence the total traffic load generated by $s_i$ is $$\sum_{j=1}^{(n-1)/2} 2(j+1) \cdot \frac{\alpha c}{2(n-1)} = \frac{(n+5)\alpha c}{8},$$

and the total traffic load overall is $$\frac{n(n+5)\alpha c}{8}.$$

As this load distributes evenly among the n sites, the load on each site on the ring is $(n+5)\alpha c/8$. This must be bounded by the site capacity, c, hence we get $$\alpha \leq \frac{8}{(n+5)}. \tag{19}$$

Finally, for a site-switch edge we get, as before, the inequality $$\alpha \leq 2\theta(1-\tau). \tag{20}$$

Of the three inequalities (18), (19) and (20), bound (19) does not depend on $\theta$, and therefore limits the value of $\alpha_{max}$. The value of $\alpha_{start}$ depends on $\tau$. The bounds expressed by inequalities (18) and (20) coincide when $\tau = (n+1)/(n+5)$. In case $\tau < (n+1)/(n+5)$, bound (20) is dominated by bound (18), and the opposite holds in case $\tau > (n+1)/(n+5)$. For each of these cases, the bounds specified in the lemma now follow by a straightforward case analysis. ∎

For the case of even n, the bounds we get are similar. The main difference in estimating the load caused by site $s_i$ is that in addition to the routes considered for the odd case, there's also a single route of length n/2 out of $s_i$, to the farthest (diagonally opposing) site.

Lemma I.3

The transmission quality of the $\theta$-expanded n-site network $E_\theta(R, \tau)$ (for even n) under the uniform requirements matrix $R^U$ is $\alpha(E_\theta(R, \tau)) = \text{Plateau}(\alpha_{start}, \alpha_{max})$, where $$\alpha_{max} = \frac{8(n-1)}{n^2+4n-4} \quad \text{and}$$

-continued $$\alpha_{start} = \begin{cases} \frac{8(n-1)\tau}{n^2}, & \tau \leq \tau_{break}, \\ 2(1-\tau), & \tau_{break} \leq \tau \leq 1, \end{cases} \quad \text{for}$$

$$\tau_{break} = \frac{n^2}{n^2+4n-4}.$$

Example

Consider the 4-vertex ring in a configuration of $\tau = 1/2$ and switch capacity c=1000. In this setting we have $\alpha_{start} = 3/4$ and $\alpha_{max} = 6/7$, hence $\theta_{break} = 8/7$. The traffic requirements are $r_{i,j} = 1000/6 \approx 167$ for every $1 \leq i,j \leq 4$. For $\theta=1$ (no link expansion) we get that 3/4 of this traffic, i.e., $f_{i,j}=125$ for every $1 \leq i,j \leq 4$, can be transmitted. At this point, the traffic saturates the inter-switch links, whose capacity is 250 units. (See FIG. 28(a).)

Now suppose the links are expanded to the maximum possible ratio of $\theta=8/7$, i.e., their capacity becomes $2000/7 \approx 286$. It then becomes possible to transmit 6/7 of the traffic, i.e., $f_{i,j} = 1000/7 \approx 143$ for every $1 \leq i,j \leq 4$. This saturates both the inter-switch links and the switches. (At this point, each switch handle a flow of $3000/7 \approx 429$ units from its site to the other sites, a similar flow in the opposite direction, and an additional amount of $1000/7 \approx 143$ units of flow between other sites, as an intermediate switch alone the route). Hence further expansions of the links without any corresponding expansion of the switches will not increase the network throughput.

As an example for an odd-size network, consider the 5-vertex ring, again in a configuration of $\tau = 1/2$ and switch capacity c=1000. In this setting we have $\alpha_{start} = 2/3$ and $\alpha_{max} = 4/5$, hence $\theta_{break} = 6/5$. The traffic requirements are $r_{i,j} = 1000/8 = 125$ for every $1 \leq i,j \leq 5$. For $\theta = 1$ we get that 2/3 of this traffic, i.e., $f_{i,j} = 250/3 \approx 83$ for every $1 \leq i,j \leq 5$, can be transmitted. At this point, the traffic saturates the inter-switch links, whose capacity is still 250 units.

Now suppose the links are expanded to the maximum possible ratio of $\theta = 6/5$, i.e., their capacity becomes 300. It then becomes possible to transmit 4/5 of the traffic, i.e., $f_{i,j} = 100$ for every $1 \leq i,j \leq 5$. This saturates both the inter-switch links and the switches. (At this point, each switch handle a flow of 400 units from its site to the other sites, a similar flow in the opposite direction, and an additional amount of 200 units of flow as an intermediate switch between its two neighboring sites). Again, further increases in throughput would require increasing both the link and the switch capacities.

I.3 Chordal Rings

Next we consider the simple chordal ring topology CR. For simplicity of presentation, assume that n is divisible by 4, and the switches are numbered consecutively by 0 through n−1, where each pair of diametrically opposite switches is connected by a chord.

Lemma I.4

The transmission quality of the $\theta$-expanded network $E_\theta(CR, \tau)$ of size $n \geq 12$ under the uniform requirements matrix $R^U$ is $\alpha(E_\theta(CR, \tau)) = \text{Plateau}(\alpha_{start}, \alpha_{max})$, where $$\alpha_{max} = \frac{16(n-1)}{n^2+12n-16} \quad \text{and}$$

$$\alpha_{start} = \begin{cases} \frac{32\tau(n-1)}{3n^2}, & \tau \leq \tau_{break}, \\ 2(1-\tau), & \tau_{break} \leq \tau \leq 1, \end{cases} \quad \text{for}$$

-continued $$\tau_{break} = \frac{3n^2}{3n^2 + 16n - 16}.$$

Proof

Figure 35:
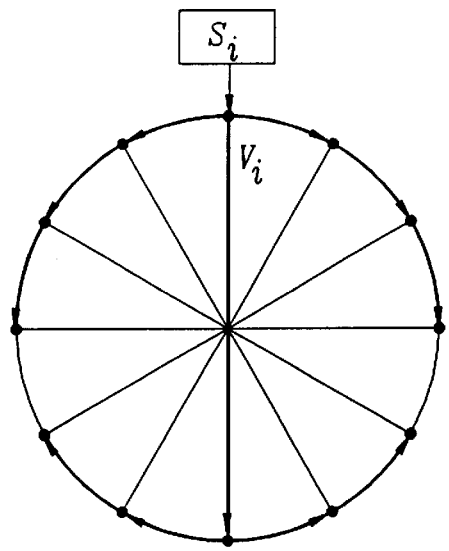
FIG. 35 is an illustration of the routing scheme from $s_i$ on the chordal ring.

By symmetry considerations, the best solution is based on breaking traffic originated at $s_i$ into two classes: traffic destined at a site within distance $\leq l$ from $s_i$ on the ring (either clockwise or counterclockwise), will be sent entirely over the ring. Traffic destined at farther sites will be sent first over the chord to $v_{(i+n/2) mod n}$, and continue on the ring from there (either clockwise or counterclockwise). see FIG. 35 for a schematic description of this routing with $l=n/4$.

As done for the ring, let us sum the load on the ring edges created by traffic originated at site $s_i$. For every $1 \leq j \leq l$, there are two routes of length $j$ out of $s_i$ (one clockwise and one counterclockwise), and each such route loads $j$ edges with $\alpha c/2(n-1)$ traffic. In addition, for every $1 \leq j \leq n/2-l-1$, there are two routes of length $j+1$ out of $s_i$ via the chord. Hence the total traffic load generated by $s_i$ over ring edges is $$\sum_{j=1}^{l} 2j \cdot \frac{\alpha c}{2(n-1)} + \sum_{j=1}^{n/2-l-1} 2j \cdot \frac{\alpha c}{2(n-1)} =$$

$$\left(\frac{l(l+1)}{2} + \frac{(n-2l-2)(n-2l)}{8}\right) \frac{\alpha c}{n-1} =$$

$$(n^2/2 - 2nl + 4l^2 - n + 4l) \frac{\alpha c}{4(n-1)}.$$

The total traffic load overall is $n$ times larger, and as this load distributes evenly among the $2n$ directed ring links, the load on each link of the ring is $$(n^2/2 - 2nl + 4l^2 - n + 4l) \frac{\alpha cn}{8(n-1)}.$$

This must be bounded by the link capacity, $\theta rc/3$, hence we get $$\alpha \leq \frac{16\theta\tau(n-1)}{3(n^2 + 8l^2 - 4nl - 2n + 8l)}. \quad (21)$$

We next carry a similar calculation for the switches. Summing separately over direct routes on the ring and routes going through the chord, the total traffic load generated by $s_i$ over ring switches is $$\sum_{j=1}^{l} 2(j+1) \cdot \frac{\alpha c}{2(n-1)} + \left(2 + \sum_{j=1}^{n/2-l-1} 2(j+2)\right) \cdot \frac{\alpha c}{2(n-1)} =$$

$$(n^2 - 4nl + 8l^2 + 6n - 8) \cdot \frac{\alpha c}{8(n-1)}.$$

The total traffic load overall is $n$ times larger, but it is distributed evenly among the $n$ switches. The load on each switch must be bounded by its capacity, $c$, yielding the inequality $$(n^2 - 4nl + 8l^2 + 6n - 8) \cdot \frac{\alpha c}{8(n-1)} \leq c, \quad (22)$$

$$\alpha \leq \frac{8(n-1)}{n^2 - 4nl + 8l^2 + 6n - 8}.$$

For a site-switch edge we get, as before, the inequality $$\alpha \leq 2\theta(1-\tau). \quad (23)$$

Finally, we need to estimate the load on chord edges. This is done similar to the analysis for ringe edges, and yields the bound $$\alpha \leq \frac{2\theta\tau(n-1)}{3(n-2l-1)}, \quad (24)$$

For small values of n (up to n=11), the best choice of l and hence the resulting values of $\alpha$ can be determined from the bounds specified by inequalities (21), (22), (23) and (24) by direct examination. For $n \geq 12$, simple analysis reveals that bound (24) is always dominated by bound (21), and hence can be discarded. We are thus left with the bounds (21), (22) and (23). To maximize $\alpha$, we need to minimize $$f_1(l) = n^2 + 8l^2 - 4nl - 2n + 8l$$

and $$f_2(l) = n^2 - 4nl + 8l^2 + 6n - 12l - 8.$$

As can be expected, both functions are minimized very close to $l=n/4$, which therefore becomes a natural choice for l. Under this choice, our bounds can be summarized as $$\alpha \leq \frac{32\theta\tau(n-1)}{3n^2},$$

$$\alpha \leq \frac{16(n-1)}{n^2 + 12n - 16},$$

$$\alpha \leq 2\theta(1-\tau).$$

The analysis continues from here on along the lines of that of the ring, yielding the bounds specified in the lemma. ∎

Example

Figure 36:
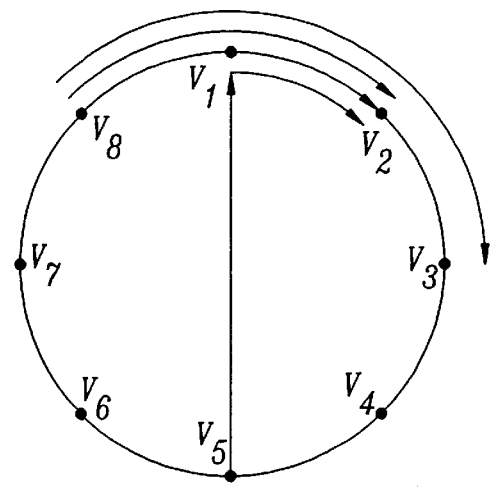
FIG. 36 is an illustration of the flow on the link $(v_1, v_2)$ on the 8-vertex chordal ring with l=2.

Consider the 8-vertex chordal ring in a configuration of $\tau=1/2$ and switch capacity $c=1200$. The traffic requirements are $r_{i,j}=600/7 \approx 86$ for every $1 \leq i,j \leq 8$. As $n \leq 11$, we examine the possible values for l (which are $0 \leq l \leq 4$), and calculate the resulting bounds on $\alpha$ from inequalities (21), (22), (23) and (24). It turns out that the best choice is $l=2$. For this choice, the smallest bound on $\alpha$ for $\theta=1$ is $\alpha_{start} \leq 7/12$. This means that it is possible to transmit an amount of $f_{i,j}=50$ units for every $1 \leq i,j \leq 8$. At this point, the traffic saturates the inter-switch links, whose capacity is 200 units. For example, supposing the vertices of the ring are $v_1$ through $v_8$, the link from $v_1$ to $v_2$ carries the 50 traffic units from $s_1$, $s_5$ and $s_8$ to $s_2$, as well as from $s_1$ to $s_3$ (see FIG. 36).

In case the link capacities are expanded by a factor of $\theta$, the bounds we get on $\alpha$ from inequalities (21), (22), (23) and (24) for $l=2$ are $\alpha \leq 7\theta/12$, $\alpha \leq 7/9$, $\alpha \leq \theta$ and $\alpha \leq 7\theta/9$. Hence $\alpha_{max}=7/9$, and $\theta_{break}=4/3$. Expanding the links to the maximum possible ratio of $\theta=4/3$ brings their capacity to $800/3 \approx 267$. It then becomes possible to transmit 7/9 of the traffic, i.e., $f_{i,j}=200/3 \approx 67$ for every $1 \leq i,j \leq 8$. This saturates both the inter-switch links and the switches. (At this point, each switch handle a flow of 1400/3 units from its site to the other sites, a similar flow in the opposite direction, and an additional amount of 800/3 units of flow between other sites, as an intermediate switch alone the route, summing up to 1200 flow units).

I.4 k-Chordal Rings

The next network we consider is the chordal ring with $K \geq 2$ chords, CR(K). For simplicity we assume that n is of the form $n=(2l+1)(K+1)$ for integer $l \geq 1$, and the switches are numbered consecutively by 0 through n−1. Each switch i is connected by a chord to the switches (i+jn/(K+1)) mod n for j=1, . . . , K.

Lemma I.5

The transmission quality of the θ-expanded network $E_\theta(CR(K), \tau)$ under the uniform requirements matrix $R^U$ is $\alpha(E_\theta(CR(K), \tau))$=Plateau($\alpha_{start}, \alpha_{max}$), where $$\alpha_{max} = \frac{2(n-1)}{(K+1)l^2 + (5K+3)l + 2K} \quad \text{and}$$

$$\alpha_{start} = \begin{cases} \frac{4\tau(n-1)}{(K+1)(K+2)l(l+1)}, & \tau \leq \tau_{break}, \\ 2(1-\tau), & \tau_{break} \leq \tau \leq 1, \text{ for} \end{cases}$$

$$\tau_{break} = \frac{(K+1)(K+2)l(l+1)}{(K+1)(K+2)l(l+1) + 2(n-1)}.$$

Proof

Figure 37:
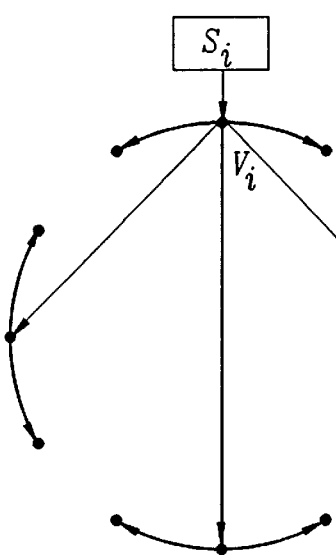
FIG. 37 is an illustration of the routing scheme on the 3-chordal ring.

By symmetry considerations similar to the case of the simple chordal ring it is clear that a near optimal solution is obtained by breaking traffic originated at $s_i$ into K+1 classes. The first class consists of traffic destined at a site within distance ≦l from $s_i$ on the ring (either clockwise or counterclockwise). This traffic will be sent entirely over the ring. Traffic destined at farther sites will be sent first over one of the chords, and continue on the ring from there (either clockwise or counterclockwise). See FIG. 37 for a schematic description of this routing on the 3-chordal ring with l=n/8.

Let us sum the load on the ring edges created by traffic originated at site $s_i$. For every 1≦j≦l, there are two routes of length j out of $s_i$ (one clockwise and one counterclockwise), and each such route loads j edges with $\alpha c/2(n-1)$ traffic. In addition, for every 1≦j≦l, there are 2K routes consisting of one chord plus j ring edges out of $s_i$ via the K chords. Hence the total traffic load generated by $s_i$ over ring edges is $$(K+1)\sum_{j=1}^{l} 2j \cdot \frac{\alpha c}{2(n-1)} = \frac{\alpha c(K+1)l(l+1)}{2(n-1)}.$$

Summing the total traffic load over all sources $s_i$ and averaging over the 2n directed ring links, the load on each link of the ring is $$\frac{\alpha c(K+1)l(l+1)}{4(n-1)}.$$

This must be bounded by the link capacity, θτc/(K+2), hence we get $$\alpha \leq \frac{4\theta\tau(n-1)}{(K+1)(K+2)l(l+1)}. \quad (25)$$

A similar calculation for the switches reveals that the load generated by the traffic originating at a site $s_i$ is:

$$K\left(\sum_{j=1}^{l} 2(j+2) \cdot \frac{\alpha c}{2(n-1)} + 2 \cdot \frac{\alpha c}{2(n-1)}\right) + \sum_{j=1}^{l} 2(j+1) \cdot \frac{\alpha c}{2(n-1)} =$$

$$\frac{\alpha c((K+1)l^2 + (5K+3)l + 2K)}{2(n-1)}.$$

(The first main summand represents loads on routes through chords, counting separately the unique route to the diagonally opposite site; the second main summand represents loads on direct routes, not using a chord). Summing over all n sources and averaging on n switches yields the inequality $$\alpha \leq \frac{2(n-1)}{(K+1)l^2 + (5K+3)l + 2K}. \quad (26)$$

For a site-switch edge we get, as before, the inequality $$\alpha \leq 2\theta(1-\tau). \quad (27)$$

Finally, for a chord edge we get $$\alpha \leq \frac{2\theta\tau(n-1)}{(K+2)(2l+1)}. \quad (28)$$

This bound is dominated by (25) whenever K≧3 (or K=2 and l≧2), and therefore can be ignored (say, for n≧9). The analysis continues from here on along the lines of that of the ring, yielding the bounds specified in the lemma. ∎

Example

Consider the 21-vertex 2-chordal ring in a configuration of τ=1/2 and switch capacity c=5040. As K=2 and l=3, we get $\tau_{break}$=18/23≧τ, and hence for θ=1 we get $\alpha_{start}$=5/18. The traffic requirements are $r_{i,j}$=5040/40=126 for every 1≦i,j≦20, of which it is possible to transmit an amount of $f_{i,j}$=35 units for every 1≦i,j≦20. At this point, the traffic saturates the inter-switch links, whose capacity is 630 units. For example, supposing the vertices of the ring are $v_1$ through $v_{20}$, the link from $v_1$ to $v_2$ participates in 18 routes, carrying the 35 traffic units for each (specifically, it is involved in six direct routes, namely, $\rho_{i,j}$ for (i,j)∈{(1,2), (1,3), (1,4), (21,2), (21,3), (20,2)}, six routes via the chords leading to $v_1$, namely, $\rho_{i,j}$ for (i,j)∈{(8,2), (8,3), (8,4), (15,2), (15,3), (15,4)}, four routes via the chords leading to $v_{21}$, namely, $\rho_{i,j}$ for (i,j)∈{(7,2), (7,3), (14,2), (14,3)}, and two routes via the chords leading to $v_{20}$, namely, $\rho_{i,j}$ for (i,j)∈{(6,2), (13,2)}.)

The link capacities can be expanded by a maximal factor of $\theta_{break}$=72/35>2, leading to $\alpha_{max}$=4/7. Expanding the links by this ratio brings their capacity to 630·72/35=1296. It then becomes possible to transmit 4/7 of the traffic, i.e., $f_{ij}$=126 ·4/7=72 for every 1≦i,j≦20. This saturates both the inter-switch links and the switches, requiring any further expansion to include the switches as well.

Figure 38:
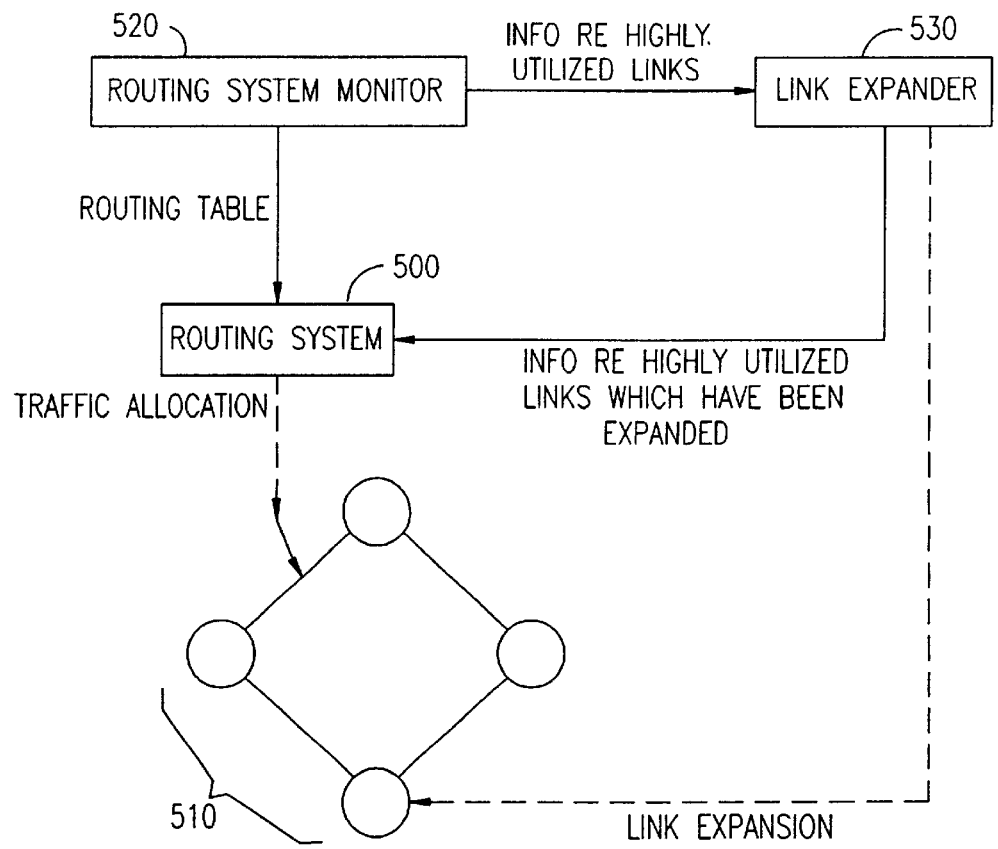
FIG. 38 is a simplified functional block diagram of bandwidth allocation apparatus constructed and operative in accordance with a preferred embodiment of the present invention.
Figure 39:
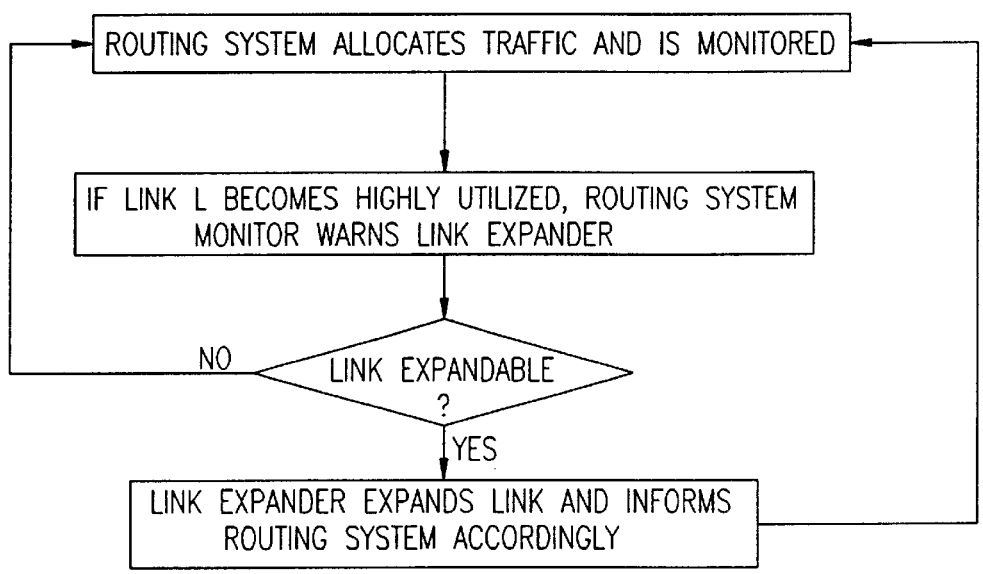
FIG. 39 is a simplified flowchart illustration of a preferred mode of operation for the apparatus of FIG. 38.

Reference is now made to FIG. 38 which is a simplified functional block diagram of bandwidth allocation apparatus constructed and operative in accordance with a preferred embodiment of the present invention. Reference is also made to FIG. 39 which is a simplified flowchart illustration of a preferred mode of operation for the apparatus of FIG. 38. As shown, the apparatus of FIG. 38 includes a conventional routing system 500 such as PNNI (Private Network-Network Interface) Recommended ATM Forum Technical Committee. The routing system 500 may either be a centralized system, as shown, or a distributed system distributed over the nodes of the network. The routing system allocates traffic to a network 510. The routing system 500 is monitored by a routing system monitor 520 which typically accesses the routing table maintained by routing system 500. If the routing system 500 is centralized, the routing system monitor is also typically centralized and conversely, if the routing system is distributed, the routing system monitor is also typically distributed.

The routing system monitor 520 continually or periodically searches the routing table for congested links or, more generally, for links which have been utilized beyond a predetermined threshold of utilization. Information regarding congested links or, more generally, regarding links which have been utilized beyond the threshold, is provided to a link expander 530. Link expander 530 may either be centralized, as shown, or may be distributed over the nodes of the network. The link expander may be centralized both if the routing system monitor is centralized and if the routing system monitor is distributed. Similarly, the link expander may be distributed both if the routing system monitor is centralized and if the routing system monitor is distributed. Link expander 530 is operative to expand, if possible, the congested or beyond-threshold utilized links and to provide updates regarding the expanded links to the routing system 500.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method for increasing the total capacity of a network, the network including a first plurality of communication edges interconnecting a second plurality of communication nodes, the first plurality of communication edges and the second plurality of communication nodes having corresponding first and second pluralities of capacity values respectively, said first and second pluralities of capacity values determining the total capacity of the network, the method comprising:

expanding the capacity value of at least an individual communication edge from among said first plurality of communication edges, the individual edge connecting first and second communication nodes from among said second plurality of communication nodes, without expanding the capacity value of said first communication node;

wherein the expanding step comprises reducing the capacity value of at least one additional communication edge connecting the first communication node and a third node, different from the second node.

2. A method according to claim 1 and also comprising:

performing said expanding step until the total capacity of the network reaches a desired level; and expanding the capacity values of at least one of the second plurality of communication edges such that all of the second plurality of communication edges have the same capacity.

3. A method according to claim 1 wherein the capacity value of the at least one additional communication edge is reduced by at least a first amount and the capacity value of the individual communication edge is expanded by no more than the first amount.

4. A method for increasing the total capacity of a network, the network including a first plurality of communication edges interconnecting a second plurality of communication nodes, the first plurality of communication edges and the second plurality of communication nodes having corresponding first and second pluralities of capacity values respectively, said first and second pluralities of capacity values determining the total capacity of the network, the method comprising:

expanding the capacity value of at least an individual communication edge from among said first plurality of communication edges, the individual edge connecting a first communication node to a second communication node, both from among said second plurality of communication nodes, without expanding the capacity values of said first and second communication nodes wherein the expanding step comprises performing at least one of the following steps:

reducing the capacity value of at least one additional communication edge connecting the first communication node to a third node different from the second node, by at least a first amount and expanding the capacity value of the individual communication edge by no more than the first amount; and reducing the capacity value of at least one additional communication edge connecting a fourth node, different from the first node, to the second node, by at least the first amount.

5. A method according to claim 4 wherein the expanding step comprises performing both of the reducing steps.

* * * * *